US010963584B2

(12) United States Patent
Safa et al.

(10) Patent No.: US 10,963,584 B2
(45) Date of Patent: Mar. 30, 2021

(54) METHOD AND SYSTEM FOR COLLABORATIVE EDITING OF A REMOTELY STORED DOCUMENT

(75) Inventors: John Safa, London (GB); Matthew Mulder, London (GB)

(73) Assignee: WORKSHARE LTD., London (GB)

( * ) Notice: Subject to any disclaimer, the term of this patent is extended or adjusted under 35 U.S.C. 154(b) by 1740 days.

(21) Appl. No.: 13/333,605

(22) Filed: Dec. 21, 2011

(65) Prior Publication Data

US 2012/0317239 A1 Dec. 13, 2012

Related U.S. Application Data

(63) Continuation-in-part of application No. 13/155,900, filed on Jun. 8, 2011, now abandoned.

(60) Provisional application No. 61/559,227, filed on Nov. 14, 2011.

(51) Int. Cl.
| | | |
|---|---|---|
| *G06F 21/62* | (2013.01) |
| *H04L 29/06* | (2006.01) |
| *G06F 40/166* | (2020.01) |
| *G06Q 10/10* | (2012.01) |
| *G06F 21/60* | (2013.01) |
| *H04L 9/08* | (2006.01) |

(52) U.S. Cl.
CPC ........ *G06F 21/6227* (2013.01); *G06F 21/602* (2013.01); *G06F 21/62* (2013.01); *G06F 40/166* (2020.01); *G06Q 10/101* (2013.01); *H04L 9/0861* (2013.01); *H04L 63/083* (2013.01); *H04L 63/0807* (2013.01); *H04L 63/107* (2013.01); *G06F 2221/2111* (2013.01); *G06F 2221/2137* (2013.01); *G06F 2221/2149* (2013.01)

(58) Field of Classification Search
CPC ................ G06F 17/21; G06F 17/3218; G06F 17/30067; G06F 17/30896; G06F 21/6227; G06F 21/602; G06F 21/62; G06F 40/166; G06F 2221/2111; G06F 2221/2137; G06F 2221/2149; H04L 9/0861; H04L 63/0807; H04L 63/083; H04L 63/107; G06Q 10/101
See application file for complete search history.

(56) References Cited

U.S. PATENT DOCUMENTS

| | | |
|---|---|---|
| 4,479,195 A | 10/1984 | Herr et al. |
| 4,949,300 A | 8/1990 | Christenson et al. |
| 5,008,853 A | 4/1991 | Bly et al. |

(Continued)

FOREIGN PATENT DOCUMENTS

| | | |
|---|---|---|
| JP | 10177650 | 6/1998 |
| JP | 2004265267 | 9/2004 |

(Continued)

OTHER PUBLICATIONS

Monga, "Robust Perceptual Image Hashing Using Feature Points," http://bluecoat-o2/?cfru=aHR0cDovL3NpZ25hbC51Y2UudXrleGFzLmVkdS9+dmIzaGFsL2hhc2gtcGFydEkucHM=, 2003.

(Continued)

*Primary Examiner* — Thu V Huynh
(74) *Attorney, Agent, or Firm* — Nixon Peabody LLP

(57) ABSTRACT

This invention discloses a novel system and method for displaying electronic documents on remote devices and enabling collaborative editing in conjunction with an Entity Content Management system.

31 Claims, 17 Drawing Sheets

(56) References Cited

U.S. PATENT DOCUMENTS

| | | |
|---|---|---|
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,379,374 A | 1/1995 | Ishizaki et al. |
| 5,446,842 A | 8/1995 | Schaeffer et al. |
| 5,608,872 A | 3/1997 | Schwartz et al. |
| 5,617,539 A | 4/1997 | Ludwig et al. |
| 5,619,649 A | 4/1997 | Kovnat et al. |
| 5,634,062 A | 5/1997 | Shimizu et al. |
| 5,671,428 A | 9/1997 | Muranaga et al. |
| 5,699,427 A | 12/1997 | Chow et al. |
| 5,745,879 A | 4/1998 | Wyman |
| RE35,861 E | 7/1998 | Queen |
| 5,787,175 A | 7/1998 | Carter |
| 5,787,444 A | 7/1998 | Gerken et al. |
| 5,801,702 A | 9/1998 | Dolan et al. |
| 5,806,078 A | 9/1998 | Hug et al. |
| 5,819,300 A | 10/1998 | Kohno et al. |
| 5,832,494 A | 11/1998 | Egger et al. |
| 5,874,953 A | 2/1999 | Webster et al. |
| 5,890,176 A | 3/1999 | Kish et al. |
| 5,890,177 A | 3/1999 | Moody et al. |
| 5,897,636 A | 4/1999 | Kaeser |
| 5,898,836 A | 4/1999 | Freivald et al. |
| 6,003,060 A | 12/1999 | Aznar et al. |
| 6,012,087 A | 1/2000 | Freivald et al. |
| 6,029,175 A | 2/2000 | Chow et al. |
| 6,038,561 A | 3/2000 | Snyder et al. |
| 6,049,804 A | 4/2000 | Burgess et al. |
| 6,067,551 A | 5/2000 | Brown |
| 6,088,702 A | 7/2000 | Plantz et al. |
| 6,128,635 A | 10/2000 | Ikeno |
| 6,145,084 A | 11/2000 | Zuili et al. |
| 6,169,976 B1 | 2/2001 | Colosso |
| 6,189,019 B1 | 2/2001 | Blumer et al. |
| 6,189,146 B1 | 2/2001 | Misra et al. |
| 6,212,534 B1 | 4/2001 | Lo et al. |
| 6,219,652 B1 | 4/2001 | Carter et al. |
| 6,219,818 B1 | 4/2001 | Freivald et al. |
| 6,243,091 B1 | 6/2001 | Berstis |
| 6,263,350 B1 | 7/2001 | Wollrath et al. |
| 6,263,364 B1 | 7/2001 | Najork et al. |
| 6,269,370 B1 | 7/2001 | Kirsch |
| 6,285,999 B1 | 9/2001 | Page |
| 6,216,112 B1 | 10/2001 | Fuller et al. |
| 6,301,368 B1 | 10/2001 | Bolle et al. |
| 6,317,777 B1 * | 11/2001 | Skarbo .............. G06F 17/30887 |
| | | 348/E7.083 |
| 6,321,265 B1 | 11/2001 | Najork et al. |
| 6,327,611 B1 | 12/2001 | Everingham |
| 6,336,123 B2 | 1/2002 | Inoue et al. |
| 6,351,755 B1 | 2/2002 | Najork et al. |
| 6,356,937 B1 * | 3/2002 | Montville .............. H04L 9/3263 |
| | | 709/206 |
| 6,377,984 B1 | 4/2002 | Najork et al. |
| 6,404,446 B1 | 6/2002 | Bates et al. |
| 6,405,219 B2 | 6/2002 | Saether |
| 6,418,433 B1 | 7/2002 | Chakrabarti et al. |
| 6,418,453 B1 | 7/2002 | Kraft et al. |
| 6,424,966 B1 | 7/2002 | Meyerzon et al. |
| 6,449,624 B1 | 9/2002 | Hammack et al. |
| 6,505,237 B2 | 1/2003 | Beyda et al. |
| 6,513,050 B1 | 1/2003 | Williams et al. |
| 6,547,829 B1 | 4/2003 | Meyerzon et al. |
| 6,556,982 B1 | 4/2003 | McGaffey et al. |
| 6,560,620 B1 | 5/2003 | Ching |
| 6,584,466 B1 | 6/2003 | Serbinis et al. |
| 6,591,289 B1 * | 7/2003 | Britton .............. G06F 17/30899 |
| | | 707/999.01 |
| 6,594,662 B1 | 7/2003 | Sieffert et al. |
| 6,596,030 B2 | 7/2003 | Ball et al. |
| 6,614,789 B1 | 9/2003 | Yazdani et al. |
| 6,658,626 B1 | 12/2003 | Aiken |
| 6,662,212 B1 | 12/2003 | Chandhok et al. |
| 6,738,762 B1 | 5/2004 | Chen et al. |
| 6,745,024 B1 | 6/2004 | DeJaco et al. |
| 6,832,202 B1 | 12/2004 | Schuyler et al. |
| 6,918,082 B1 | 7/2005 | Gross |
| 7,035,427 B2 | 4/2006 | Rhoads |
| 7,085,735 B1 | 8/2006 | Hall et al. |
| 7,107,518 B2 | 9/2006 | Ramaley et al. |
| 7,113,615 B2 | 9/2006 | Rhoads et al. |
| 7,152,019 B2 | 12/2006 | Tarantola et al. |
| 7,181,492 B2 | 2/2007 | Wen et al. |
| 7,194,761 B1 * | 3/2007 | Champagne ............ G06F 21/31 |
| | | 709/232 |
| 7,212,955 B2 | 5/2007 | Kirshenbaum et al. |
| 7,233,686 B2 | 6/2007 | Hamid |
| 7,240,207 B2 | 7/2007 | Weare |
| 7,299,504 B1 | 11/2007 | Tiller et al. |
| 7,321,864 B1 | 1/2008 | Gendler |
| 7,353,455 B2 | 4/2008 | Malik |
| 7,356,704 B2 | 4/2008 | Rinkevich et al. |
| 7,434,164 B2 | 10/2008 | Salesin et al. |
| 7,454,778 B2 | 11/2008 | Pearson et al. |
| 7,496,841 B2 | 2/2009 | Hadfield et al. |
| 7,564,997 B2 | 7/2009 | Hamid |
| 7,613,770 B2 | 11/2009 | Li |
| 7,624,447 B1 | 11/2009 | Horowitz et al. |
| 7,627,613 B1 | 12/2009 | Dulitz et al. |
| 7,673,324 B2 | 3/2010 | Tirosh et al. |
| 7,680,785 B2 | 3/2010 | Najork |
| 7,685,298 B2 * | 3/2010 | Day .................. H04L 29/12594 |
| | | 709/227 |
| 7,694,336 B2 | 4/2010 | Rinkevich et al. |
| 7,707,153 B1 | 4/2010 | Petite et al. |
| 7,720,256 B2 | 5/2010 | Desprez et al. |
| 7,730,175 B1 | 6/2010 | Roesch et al. |
| 7,788,235 B1 | 8/2010 | Yeo |
| 7,796,309 B2 | 9/2010 | Sadovsky et al. |
| 7,797,724 B2 | 9/2010 | Calvin |
| 7,818,678 B2 | 10/2010 | Massand |
| 7,844,116 B2 | 11/2010 | Monga |
| 7,857,201 B2 | 12/2010 | Silverbrook et al. |
| 7,877,790 B2 | 1/2011 | Vishik et al. |
| 7,890,752 B2 | 2/2011 | Bardsley et al. |
| 7,903,822 B1 | 3/2011 | Hair et al. |
| 7,904,484 B2 * | 3/2011 | Culpepper ................ G06F 8/60 |
| | | 707/802 |
| 7,941,844 B2 | 5/2011 | Anno |
| 7,958,101 B1 * | 6/2011 | Teugels ............. G06F 17/30126 |
| | | 707/705 |
| 8,005,277 B2 | 8/2011 | Tulyakov et al. |
| 8,042,112 B1 | 10/2011 | Zhu et al. |
| 8,117,225 B1 * | 2/2012 | Zilka ................. G06F 17/30864 |
| | | 707/672 |
| 8,145,724 B1 | 3/2012 | Hawks et al. |
| 8,181,036 B1 | 5/2012 | Nachenberg |
| 8,196,030 B1 | 6/2012 | Wang et al. |
| 8,201,254 B1 | 6/2012 | Wilhelm et al. |
| 8,233,723 B2 | 7/2012 | Sundaresan |
| 8,286,085 B1 | 10/2012 | Denise |
| 8,286,171 B2 | 10/2012 | More et al. |
| 8,301,994 B1 | 10/2012 | Shah |
| 8,316,237 B1 * | 11/2012 | Felsher ................ H04L 9/0825 |
| | | 380/282 |
| 8,406,456 B2 | 3/2013 | More |
| 8,473,847 B2 | 6/2013 | Glover |
| 8,555,080 B2 | 10/2013 | More |
| 8,572,388 B2 | 10/2013 | Boemker et al. |
| 8,620,020 B2 | 12/2013 | More |
| 8,620,872 B1 | 12/2013 | Killalea |
| 8,635,295 B2 | 1/2014 | Mulder |
| 8,670,600 B2 | 3/2014 | More |
| 8,732,127 B1 | 5/2014 | Rotterdam et al. |
| 8,776,190 B1 * | 7/2014 | Cavage .................. G06F 21/62 |
| | | 380/255 |
| 8,797,603 B1 | 8/2014 | Dougherty et al. |
| 8,839,100 B1 | 9/2014 | Donald |
| 8,856,143 B2 | 10/2014 | Egnor |
| 9,092,636 B2 | 7/2015 | More et al. |
| 9,098,500 B1 | 8/2015 | Asokan et al. |

(56) References Cited

U.S. PATENT DOCUMENTS

| | | | |
|---|---|---|---|
| 9,311,624 B2 | 4/2016 | Diament et al. | |
| 9,652,485 B1 | 5/2017 | Bhargava et al. | |
| 2001/0018739 A1 | 8/2001 | Anderson et al. | |
| 2001/0042073 A1* | 11/2001 | Saether | G06F 17/30194 |
| 2002/0010682 A1 | 1/2002 | Johnson | |
| 2002/0016959 A1 | 2/2002 | Barton et al. | |
| 2002/0019827 A1 | 2/2002 | Shiman et al. | |
| 2002/0023158 A1 | 2/2002 | Polizzi et al. | |
| 2002/0052928 A1 | 5/2002 | Stern et al. | |
| 2002/0063154 A1 | 5/2002 | Hoyos et al. | |
| 2002/0065827 A1 | 5/2002 | Christie et al. | |
| 2002/0065848 A1 | 5/2002 | Walker et al. | |
| 2002/0073188 A1 | 6/2002 | Rawson, III | |
| 2002/0087515 A1 | 7/2002 | Swannack et al. | |
| 2002/0099602 A1 | 7/2002 | Moskowitz et al. | |
| 2002/0120648 A1 | 8/2002 | Ball et al. | |
| 2002/0129062 A1 | 9/2002 | Luparello | |
| 2002/0136222 A1 | 9/2002 | Robohm | |
| 2002/0138744 A1 | 9/2002 | Schleicher et al. | |
| 2002/0159239 A1 | 10/2002 | Amie et al. | |
| 2002/0164058 A1 | 11/2002 | Aggarwal et al. | |
| 2003/0009518 A1* | 1/2003 | Harrow | H04L 47/10 709/203 |
| 2003/0009528 A1* | 1/2003 | Sharif | H04L 69/329 709/206 |
| 2003/0037010 A1 | 2/2003 | Schmelzer | |
| 2003/0046572 A1 | 3/2003 | Newman et al. | |
| 2003/0051054 A1 | 3/2003 | Redlich et al. | |
| 2003/0061260 A1 | 3/2003 | Rajkumar | |
| 2003/0061350 A1 | 3/2003 | Masuoka et al. | |
| 2003/0078880 A1 | 4/2003 | Alley et al. | |
| 2003/0084279 A1 | 5/2003 | Campagna | |
| 2003/0093755 A1 | 5/2003 | O'Carroll | |
| 2003/0097454 A1* | 5/2003 | Yamakawa | H04L 29/12018 709/229 |
| 2003/0112273 A1 | 6/2003 | Hadfield | |
| 2003/0115273 A1 | 6/2003 | Delia et al. | |
| 2003/0121008 A1 | 6/2003 | Tischer | |
| 2003/0131005 A1 | 7/2003 | Berry | |
| 2003/0147267 A1 | 8/2003 | Huttunen | |
| 2003/0158839 A1 | 8/2003 | Faybishenko et al. | |
| 2003/0191799 A1* | 10/2003 | Araujo | H04L 63/0272 709/203 |
| 2003/0196087 A1* | 10/2003 | Stringer | G06F 21/6209 713/171 |
| 2003/0204399 A1 | 10/2003 | Wolf | |
| 2003/0223624 A1 | 12/2003 | Hamid | |
| 2003/0233419 A1 | 12/2003 | Beringer | |
| 2003/0237047 A1 | 12/2003 | Borson | |
| 2004/0002049 A1 | 1/2004 | Beavers et al. | |
| 2004/0031052 A1* | 2/2004 | Wannamaker | A63F 13/12 725/61 |
| 2004/0122659 A1 | 6/2004 | Hourihane et al. | |
| 2004/0128321 A1 | 7/2004 | Hamer | |
| 2004/0148567 A1 | 7/2004 | Jeon et al. | |
| 2004/0186851 A1 | 9/2004 | Jhingan et al. | |
| 2004/0187076 A1* | 9/2004 | Ki | G06F 17/30887 715/208 |
| 2004/0225645 A1 | 11/2004 | Rowney et al. | |
| 2004/0261016 A1 | 12/2004 | Glass et al. | |
| 2005/0021980 A1* | 1/2005 | Kanai | G06F 21/608 713/182 |
| 2005/0027704 A1 | 2/2005 | Hammond et al. | |
| 2005/0038893 A1 | 2/2005 | Graham | |
| 2005/0044197 A1* | 2/2005 | Lai | G06Q 10/10 709/223 |
| 2005/0055306 A1 | 3/2005 | Miller et al. | |
| 2005/0055337 A1 | 3/2005 | Bebo et al. | |
| 2005/0071755 A1 | 3/2005 | Harrington et al. | |
| 2005/0108293 A1 | 5/2005 | Lipman et al. | |
| 2005/0138350 A1 | 6/2005 | Hariharan | |
| 2005/0138540 A1 | 6/2005 | Baltus et al. | |
| 2005/0204008 A1 | 9/2005 | Shinbrood | |
| 2005/0251738 A1 | 11/2005 | Hirano et al. | |
| 2005/0251748 A1 | 11/2005 | Gusmorino et al. | |
| 2005/0256893 A1 | 11/2005 | Perry | |
| 2005/0268327 A1 | 12/2005 | Starikov | |
| 2005/0278421 A1 | 12/2005 | Simpson et al. | |
| 2006/0005247 A1 | 1/2006 | Zhang et al. | |
| 2006/0013393 A1 | 1/2006 | Ferchichi et al. | |
| 2006/0021031 A1 | 1/2006 | Leahy et al. | |
| 2006/0047765 A1 | 3/2006 | Mizoi et al. | |
| 2006/0050937 A1 | 3/2006 | Hamid | |
| 2006/0059196 A1 | 3/2006 | Sato et al. | |
| 2006/0064717 A1 | 3/2006 | Shibata et al. | |
| 2006/0067578 A1 | 3/2006 | Fuse | |
| 2006/0069740 A1* | 3/2006 | Ando | H04W 4/02 709/217 |
| 2006/0098850 A1 | 5/2006 | Hamid | |
| 2006/0112120 A1 | 5/2006 | Rohall | |
| 2006/0129627 A1* | 6/2006 | Phillips | H04L 63/10 709/200 |
| 2006/0158676 A1* | 7/2006 | Hamada | G06F 21/6218 358/1.14 |
| 2006/0171588 A1 | 8/2006 | Chellapilla et al. | |
| 2006/0184505 A1* | 8/2006 | Kedem | G06F 3/0608 |
| 2006/0190493 A1 | 8/2006 | Kawai et al. | |
| 2006/0218004 A1 | 9/2006 | Dworkin et al. | |
| 2006/0218643 A1* | 9/2006 | DeYoung | H04N 7/162 726/26 |
| 2006/0224589 A1 | 10/2006 | Rowney | |
| 2006/0236246 A1 | 10/2006 | Bono et al. | |
| 2006/0259524 A1 | 11/2006 | Horton | |
| 2006/0259949 A1 | 11/2006 | Schaefer et al. | |
| 2006/0261112 A1 | 11/2006 | Todd et al. | |
| 2006/0271947 A1 | 11/2006 | Lienhart et al. | |
| 2006/0272024 A1 | 11/2006 | Huang et al. | |
| 2006/0277229 A1* | 12/2006 | Yoshida | G06F 17/30011 |
| 2006/0294468 A1 | 12/2006 | Sareen et al. | |
| 2006/0294469 A1 | 12/2006 | Sareen et al. | |
| 2007/0005589 A1 | 1/2007 | Gollapudi | |
| 2007/0011211 A1 | 1/2007 | Reeves et al. | |
| 2007/0025265 A1 | 2/2007 | Porras et al. | |
| 2007/0027830 A1 | 2/2007 | Simons et al. | |
| 2007/0038704 A1 | 2/2007 | Brown et al. | |
| 2007/0094510 A1 | 4/2007 | Ross et al. | |
| 2007/0100991 A1 | 5/2007 | Daniels et al. | |
| 2007/0101154 A1 | 5/2007 | Bardsley et al. | |
| 2007/0101413 A1 | 5/2007 | Vishik et al. | |
| 2007/0112930 A1 | 5/2007 | Foo et al. | |
| 2007/0118598 A1 | 5/2007 | Bedi et al. | |
| 2007/0150443 A1 | 6/2007 | Bergholz et al. | |
| 2007/0156785 A1 | 7/2007 | Hines et al. | |
| 2007/0179967 A1* | 8/2007 | Zhang | G06F 17/301 |
| 2007/0192728 A1 | 8/2007 | Finley et al. | |
| 2007/0220061 A1 | 9/2007 | Tirosh et al. | |
| 2007/0220068 A1 | 9/2007 | Thompson et al. | |
| 2007/0253608 A1 | 11/2007 | Tulyakov et al. | |
| 2007/0261099 A1 | 11/2007 | Broussard et al. | |
| 2007/0261112 A1 | 11/2007 | Todd et al. | |
| 2007/0294318 A1 | 12/2007 | Arora et al. | |
| 2007/0294612 A1 | 12/2007 | Drucker et al. | |
| 2007/0299880 A1 | 12/2007 | Kawabe et al. | |
| 2008/0022003 A1 | 1/2008 | Alve | |
| 2008/0028017 A1 | 1/2008 | Garbow et al. | |
| 2008/0033913 A1 | 2/2008 | Winburn | |
| 2008/0034282 A1 | 2/2008 | Zernik | |
| 2008/0034327 A1 | 2/2008 | Cisler et al. | |
| 2008/0040388 A1 | 2/2008 | Petri et al. | |
| 2008/0065668 A1 | 3/2008 | Spence et al. | |
| 2008/0080515 A1 | 4/2008 | Tombroff et al. | |
| 2008/0082529 A1 | 4/2008 | Mantena et al. | |
| 2008/0082930 A1 | 4/2008 | Omernick et al. | |
| 2008/0091465 A1 | 4/2008 | Fuschino et al. | |
| 2008/0091735 A1 | 4/2008 | Fukushima et al. | |
| 2008/0094370 A1 | 4/2008 | Ording et al. | |
| 2008/0162527 A1 | 7/2008 | Pizano et al. | |
| 2008/0177733 A1* | 7/2008 | Virdy | G06F 17/30616 |
| 2008/0177782 A1 | 7/2008 | Poston et al. | |
| 2008/0209001 A1 | 8/2008 | Boyle et al. | |
| 2008/0215667 A1 | 9/2008 | Rothbarth et al. | |
| 2008/0219495 A1 | 9/2008 | Hulten et al. | |
| 2008/0235760 A1 | 9/2008 | Broussard et al. | |

(56) References Cited

U.S. PATENT DOCUMENTS

| | | |
|---|---|---|
| 2008/0263363 A1 | 10/2008 | Jueneman et al. |
| 2008/0275694 A1 | 11/2008 | Varone |
| 2008/0288597 A1 | 11/2008 | Christensen et al. |
| 2008/0301193 A1 | 12/2008 | Massand |
| 2008/0306894 A1 | 12/2008 | Rajkumar et al. |
| 2008/0310624 A1 | 12/2008 | Celikkan |
| 2008/0320316 A1 | 12/2008 | Waldspurger et al. |
| 2009/0025087 A1 | 1/2009 | Peirson et al. |
| 2009/0030997 A1 | 1/2009 | Malik |
| 2009/0034804 A1 | 2/2009 | Cho et al. |
| 2009/0049132 A1 | 2/2009 | Gutovski |
| 2009/0052778 A1 | 2/2009 | Edgecomb et al. |
| 2009/0064326 A1 | 3/2009 | Goldstein |
| 2009/0083073 A1 | 3/2009 | Mehta et al. |
| 2009/0083384 A1 | 3/2009 | Bhogal et al. |
| 2009/0129002 A1 | 5/2009 | Wu et al. |
| 2009/0150462 A1* | 6/2009 | McClanahan ..... G06F 17/30197 |
| 2009/0164427 A1 | 6/2009 | Shields et al. |
| 2009/0177754 A1 | 7/2009 | Brezina et al. |
| 2009/0183257 A1 | 7/2009 | Prahalad |
| 2009/0187567 A1 | 7/2009 | Rolle |
| 2009/0216843 A1 | 8/2009 | Willner et al. |
| 2009/0222450 A1 | 9/2009 | Zigelman |
| 2009/0234863 A1 | 9/2009 | Evans |
| 2009/0241187 A1 | 9/2009 | Troyansky |
| 2009/0271620 A1 | 10/2009 | Sudhakar |
| 2009/0319480 A1* | 12/2009 | Saito ..................... G06F 21/6218 |
| 2010/0011077 A1 | 1/2010 | Shkolnikov et al. |
| 2010/0011428 A1* | 1/2010 | Atwood ................ G06Q 20/40 726/7 |
| 2010/0017404 A1 | 1/2010 | Banerjee et al. |
| 2010/0017850 A1 | 1/2010 | More et al. |
| 2010/0049807 A1 | 2/2010 | Thompson |
| 2010/0058053 A1 | 3/2010 | Wood et al. |
| 2010/0064004 A1* | 3/2010 | Ravi ................. G06F 17/30011 709/204 |
| 2010/0064372 A1 | 3/2010 | More et al. |
| 2010/0070448 A1 | 3/2010 | Omoigui |
| 2010/0076985 A1 | 3/2010 | Egnor |
| 2010/0083230 A1 | 4/2010 | Ramakrishnan |
| 2010/0114985 A1 | 5/2010 | Chaudhary et al. |
| 2010/0114991 A1 | 5/2010 | Chaudhary et al. |
| 2010/0131604 A1 | 5/2010 | Portilla |
| 2010/0146382 A1 | 6/2010 | Abe et al. |
| 2010/0174678 A1 | 7/2010 | Massand |
| 2010/0174761 A1 | 7/2010 | Longobardi et al. |
| 2010/0174826 A1* | 7/2010 | Sharma ................ H04L 67/02 709/235 |
| 2010/0186062 A1 | 7/2010 | Banti et al. |
| 2010/0217987 A1 | 8/2010 | Shevade |
| 2010/0235763 A1 | 9/2010 | Massand |
| 2010/0241943 A1 | 9/2010 | Massand |
| 2010/0257352 A1 | 10/2010 | Errico |
| 2010/0274765 A1 | 10/2010 | Murphy et al. |
| 2010/0287246 A1 | 11/2010 | Klos et al. |
| 2010/0299727 A1 | 11/2010 | More et al. |
| 2010/0318530 A1 | 12/2010 | Massand |
| 2010/0332428 A1 | 12/2010 | McHenry et al. |
| 2010/0332682 A1 | 12/2010 | Sharp et al. |
| 2011/0029625 A1 | 2/2011 | Cheng et al. |
| 2011/0035655 A1* | 2/2011 | Heineken ............... G06F 17/211 715/223 |
| 2011/0041165 A1* | 2/2011 | Bowen .................... H04L 63/08 726/5 |
| 2011/0106892 A1 | 5/2011 | Nelson et al. |
| 2011/0107106 A1 | 5/2011 | Morii et al. |
| 2011/0125806 A1* | 5/2011 | Park ..................... G06F 21/6218 707/803 |
| 2011/0141521 A1 | 6/2011 | Qiao |
| 2011/0145229 A1 | 6/2011 | Vailaya et al. |
| 2011/0197121 A1 | 8/2011 | Kletter |
| 2011/0225646 A1 | 9/2011 | Crawford |
| 2011/0252098 A1 | 10/2011 | Kumar |
| 2011/0252310 A1 | 10/2011 | Rahaman et al. |
| 2011/0264907 A1 | 10/2011 | Betz et al. |
| 2011/0314384 A1 | 12/2011 | Lindgren et al. |
| 2012/0011361 A1 | 1/2012 | Guerrero et al. |
| 2012/0016867 A1 | 1/2012 | Clemm et al. |
| 2012/0030563 A1 | 2/2012 | Lemonik et al. |
| 2012/0036157 A1 | 2/2012 | Rolle |
| 2012/0079267 A1* | 3/2012 | Lee ..................... G06F 21/6218 713/156 |
| 2012/0079596 A1 | 3/2012 | Thomas et al. |
| 2012/0110092 A1 | 5/2012 | Keohane et al. |
| 2012/0117096 A1 | 5/2012 | Massand |
| 2012/0117644 A1 | 5/2012 | Soeder |
| 2012/0131635 A1 | 5/2012 | Huapaya |
| 2012/0133989 A1 | 5/2012 | Glover |
| 2012/0136862 A1 | 5/2012 | Glover |
| 2012/0136951 A1 | 5/2012 | Mulder |
| 2012/0151316 A1 | 6/2012 | Massand |
| 2012/0173881 A1 | 7/2012 | Trotter |
| 2012/0185511 A1 | 7/2012 | Mansfield et al. |
| 2012/0246115 A1 | 9/2012 | King et al. |
| 2012/0260188 A1 | 10/2012 | Park et al. |
| 2012/0265817 A1 | 10/2012 | Vidalenc et al. |
| 2012/0317239 A1 | 12/2012 | Mulder |
| 2012/0317414 A1 | 12/2012 | Glover |
| 2012/0317479 A1 | 12/2012 | Safa |
| 2013/0007070 A1 | 1/2013 | Pitschke |
| 2013/0060799 A1 | 3/2013 | Massand |
| 2013/0074195 A1 | 3/2013 | Johnston et al. |
| 2013/0074198 A1 | 3/2013 | More |
| 2013/0097421 A1 | 4/2013 | Lim |
| 2013/0212707 A1* | 8/2013 | Donahue .................. H04L 63/10 726/29 |
| 2013/0227043 A1 | 8/2013 | Murakami |
| 2013/0227397 A1 | 8/2013 | Tvorun et al. |
| 2014/0032489 A1* | 1/2014 | Hebbar ............. G06F 17/30896 707/608 |
| 2014/0115436 A1 | 4/2014 | Beaver et al. |
| 2014/0136497 A1 | 5/2014 | Georgiev et al. |
| 2014/0181223 A1 | 6/2014 | Homsany et al. |
| 2014/0279843 A1 | 9/2014 | Von Weihe |
| 2014/0280336 A1 | 9/2014 | Glover |
| 2014/0281872 A1 | 9/2014 | Glover |
| 2015/0026464 A1 | 1/2015 | Hanner et al. |
| 2015/0172058 A1 | 6/2015 | Follis |
| 2016/0350270 A1 | 12/2016 | Nakazawa |

FOREIGN PATENT DOCUMENTS

| | | |
|---|---|---|
| JP | 2007299364 | 11/2007 |
| KR | 1020010078840 | 8/2001 |
| KR | 20040047413 | 6/2004 |
| KR | 1020040047413 | 6/2004 |
| KR | 1020060048686 | 5/2006 |
| KR | 0049518 | 5/2007 |
| KR | 200070049518 | 5/2007 |
| KR | 1020070049518 | 5/2007 |
| KR | 102008002960 | 4/2008 |
| KR | 1020080029602 | 4/2008 |
| WO | 2000060504 | 10/2000 |
| WO | WO0060504 | 10/2000 |
| WO | 2001052473 | 7/2001 |
| WO | 2001052473 A1 | 7/2001 |
| WO | 2002101577 | 12/2002 |
| WO | 2002101577 A1 | 12/2002 |

OTHER PUBLICATIONS

PC Magazine "Pure Intranets: Real-Time Internet Collboration", http://www.zdnet.com/pcmag/featuresgroupware/gpwst.htm, Aug. 30, 2001, 2 pages.

Microsoft, "Microsoft XP, Product Guide", Aug. 24, 2001, pp. 1-26, Microsoft.

Written Opinion PCT Application No. PCT/US2009/065019 dated Jun. 4, 2010, 5 pages.

Written Opinion of PCT Application No. PCT/2009/064919, dated Jul. 1, 2010, 4 pages.

(56) References Cited

OTHER PUBLICATIONS

Cox et al; Microsoft Office Word 2007 Step by Step; Jan. 17, 2007; Microsoft Press; pp. 283-293.
M. Eric Johnson et al., The Evolution of the Peer-to-Peer File Sharing Industry and the Security Risks for Users, Jan. 7-10, 2008, IEEE, pp. 1-10.
Nathanial S. Good et al., Usability and privacy: a study of KaZaA P2P file-sharing, Apr. 5-10, 2003, ACM, vol. No. 5, Issue No. 1, pp. 137-144.
Dominik Grolmund et al., Cryptree: A Folder Tree Structure for Cryptographic File Systems, Oct. 2-4, 2006, IEEE, pp. 189-198.
Final Office Action dated April 16, 2012 in Co-Pending U.S. Appl. No. 12/177,043, filed July 21, 2008.
Final Office Action dated April 17, 2007 for U.S. Appl. No. 10/023,010, filed Dec. 17, 2001, Issued U.S. Pat. No. 7,496,841.
Advisory Action dated Apr. 12, 2013, in Co-Pending U.S. Appl. No. 12/621,429 by More, S., filed Nov. 18, 2009.
Advisory Action dated Apr. 12, 2013, in Co-Pending U.S. Appl. No. 12/621,429 of More, S., filed Nov. 18, 2009.
Advisory Action dated Nov. 1, 2013, in Co-Pending U.S. Appl. No. 13/659,793 by More, S., filed Oct. 24, 2012.
Co-pending U.S. Appl. No. 10/023,010, filed Dec. 17, 2001.
Co-pending U.S. Appl. No. 10/136,733, filed Apr. 30, 2002.
Co-pending U.S. Appl. No. 12/177,043, filed Jul. 21, 2008.
Co-pending U.S. Appl. No. 12/209,082, filed Sep. 11, 2008.
Co-pending U.S. Appl. No. 12/209,096, filed Sep. 11, 2008.
Co-pending U.S. Appl. No. 12/275,185, filed Nov. 20, 2008.
Co-pending U.S. Appl. No. 12/621,429, filed Nov. 18, 2009.
Co-pending U.S. Appl. No. 12/844,818, filed Jul. 27, 2010.
Co-pending U.S. Appl. No. 13/306,765, filed Nov. 29, 2011.
Co-pending U.S. Appl. No. 13/306,798, filed Nov. 29, 2011.
Co-pending U.S. Appl. No. 13/306,819, filed Nov. 29, 2011.
Co-pending U.S. Appl. No. 13/620,364, filed Sep. 14, 2012.
Co-pending U.S. Appl. No. 13/659,793, filed Oct. 24, 2012.
Co-Pending U.S. Appl. No. 13/659,817, filed Oct. 24, 2012.
Dominik Grolimund et al., Cryptree: A Folder Tree Structure for Cryptographic File Systems, Oct. 2-4, 2006, IEEE, pp. 189-198.
Final Office Action dated Apr. 16, 2012 in Co-Pending U.S. Appl. No. 12/177,043, filed Jul. 21, 2008.
Final Office Action dated Apr. 17, 2007 for U.S. Appl. No. 10/023,010, filed Dec. 17, 2001, Issued U.S. Pat. No. 7,496,841.
Final Office Action dated Apr. 17, 2007 for U.S. Appl. No. 10/023,010, filed Dec. 7, 2001, Issued U.S. Pat. No. 7,496,841.
Final Office Action dated Apr. 17, 2007 in Co-Pending U.S. Appl. No. 10/023,010, filed Dec. 17, 2001, Issued U.S. Pat. No. 7,496,841.
Final Office Action dated Aug. 12, 2011 for U.S. Appl. No. 12/209,096, filed Sep. 11, 2008.
Final Office Action dated Aug. 12, 2011 in Co-Pending U.S. Appl. No. 12/209,096, filed Sep. 11, 2008.
Final Office Action dated Aug. 16, 2013 in co-pending U.S. Appl. No. 13/306,798 of Glover, R.W., filed Nov. 29, 2011.
Final Office Action dated Feb. 1, 2013 in Co-Pending U.S. Appl. No. 12/621,429 of More, S., filed Nov. 18, 2009.
Final Office Action dated Jan. 18, 2013 in Co-Pending U.S. Appl. No. 12/844,818 by Glover, R., filed Jul. 27, 2010.
Final Office Action dated Jan. 18, 2013 in Co-Pending U.S. Appl. No. 12/844,818 of Glover, R., filed Jul. 27, 2010.
Final Office Action dated May 10, 2012 in Co-Pending U.S. Appl. No. 12/209,082, filed Sep. 11, 2008.
Final Office Action dated May 10, 2012 in Co-Pending U.S. Appl. No. 12/209,082.
Final Office Action dated Oct. 21, 2013, in Co-Pending U.S. Appl. No. 13/659,793 by More, S., filed Oct. 24, 2012.
International Search Report of PCT Application No. PCT/IB2002/005821, dated Jan. 30, 2004, 6 pages.
International Search Report of PCT Application No. PCT/2009/064919, dated Jul. 1, 2010, 3 pages.
International Search Report of PCT Application No. PCT/IB2002/005821, dated Jan. 3, 2004, 6 pages.
XP-002257904, "Workshare Debuts Synergy", 2003, 3 pages.
Xuefeng Liang; et al., "Fingerprint Matching Using Minutia Polygons," Pattern Recognition, 2006, ICPR 2006, 18th International Conference on, vol. 1, No., pp. 1046-1049.
Xuefeng Liang; et al., "Fingerprint Matching Using Minutia Polygons," Pattern Recognition, 2006, ICPR 2006, 18th International Confernce on, vol. 1, No., pp. 1046-1049.
Xuefeng Liang; Tetsuo Asano; , "Fingerprint Matching Using Minutia Polygons," Pattern Recognition, 2006. ICPR 2006. 18th International Conference on , vol. 1, No., pp. 1046-1049.
Yung et al, Generating Robust Digital Signature for Image/Video Authentication, Multimedia and Security Workshop at ACM Multimedia '98, Bristol, U.K., Sep. 1998.
Restriction Requirement dated Feb. 14, 2005 for U.S. Appl. No. 10/023,010, filed Dec. 17, 2001, Issued U.S. Pat. No. 7,496,841.
Restriction Requirement dated Feb. 14, 2005 in U.S. Appl. No. 10/023,010, filed Dec. 17, 2001, Issued Patent No. 7,496,841.
Restriction Requirement dated Feb. 5, 2008 for U.S. Appl. No. 10/023,010, filed Dec. 17, 2001, Issued Patent No. 7,496,841.
Restriction Requirement dated Feb. 5,2008 in Co-Pending U.S. Appl. No. 10/023,010, filed Dec. 17, 2001, Issued Pat. No. 7,496,841.
Restriction Requirement dated Jun. 30, 2006 for U.S. Appl. No. 10/136,733, filed Apr. 30, 2002.
Restriction Requirement dated Jun. 30, 2006 in U.S. Appl. No. 10/136,733, filed Apr. 30, 2002.
Roussev, et al., "Integrating XML and Object-based Programming for Distributed Collaboration", IEEE, 2000, pp. 254-259.
Stephen Voida et al., Share and Share Alike: Exploring the User Interface Affordances of File Sharing, Apr. 22-27, 2006, ACM, pp. 1-10.
Sujoy Roy, et al., "Robust Hash for Detecting and Localizing Image Tampering," Image Processing, 2007, ICIP 2007, IEEE International Conference on, vol. 6, No., pp. V1-117-V1-120, Sep. 16, 2007-Oct. 19, 2007.
Sujoy Roy; Qibin Sun; , "Robust Hash for Detecting and Localizing Image Tampering," Image Processing, 2007. ICIP 2007. IEEE International Conference on , vol. 6, No., pp. VI-117-VI-120, Sep. 16, 2007-Oct. 19, 2007.
Tsai, et al., "A document Workspace for Collaboration and Annotation based on XML Technology", Department of Electrical Engineering, 2001, pp. 165-172.
Tsai, et al., "A Document Workspace for Collaboration and Annotation based on XML Technology", IEEE, 2000, pp. 165-172.
Tuklakov, et al., "Symmetric Hash Functions for Fingerprint Minutiae," International Workshop on Pattern Recognition for Crime Prevention, Security and Surveillance, Bath U.K., Oct. 2, 2005, pp. 30-38.
Tulyakov et al, Symmetric Hash Functions for Fingerprint Minutiae, ICAPR 2005, LNCS 3687, pp. 30-38, 2005.
Tulyakov et al. "Symmetric Hash Functions for Fingerprint Minutiae." International Workshop on Patter Recognition for Crime Prevention, Security and Surveillance, Bath U.K., Oct. 2, 2005, pp. 30-38.
Tulyakov, et al., "Symmetric Hash Functions for Fingerprint Minutiae," International Workshop on Pattern Recognition for Crime Prevention, Security and Surveillance, Bath U.K., Oct. 2, 2005, pp. 30-38.
U.S. Appl. No. 13/789,104, filed Mar. 7, 2013, Gofman.
V Monga, B.L. Evans Perceptual image hashing via feature points: performance evaluation and tradeoffs IEEE Transactions on Image Processing, 15 (11) (2006), pp. 3453-3466.
Weiss et al., Lightweight document matching for help-desk applications, In: Intelligent Systems and their Applications, IEEE, Vo. 15, Issue:2, pp. 57-61, ISSN 1094-7167, 2000.
Wells et al., "Groupware & Collaboration Support", www.objs.com/survey/groupwar.htm, Aug. 30, 2001, 10 pages.
Written Opinion of PCT Application No. PCT/US2009/051313, dated Mar. 3, 2010, 3 pages.
Written Opinion of PCT Application No. PCT/US2009/051313, dated Mar. 3, 2010, 4 pages.
Written Opinion PCT Application No. PCT/2009/064919, dated Jul. 1, 2010, 4 pages.
Written Opinion PCT Application No. PCT/US2009/056651, dated Apr. 21, 2010, pp. 1-5.

(56) References Cited

OTHER PUBLICATIONS

Written Opinion PCT Application No. PCT/US2009/056668 dated Apr. 16, 2010 pp. 1-4.
Written Opinion PCT Application No. PCT/US2009/056668, dated Apr. 16, 2010, 4 pages.
Written Opinion PCT Application No. PCT/US2009/064919 dated Jul. 1, 2010, pp. 1-4.
Written Opinion PCT Application No. PCT/US2009/065019 dated Jun. 4, 2010, p. 1-5.
Written Opinion PCT Application No. PCT/US2009/065019 dated Jun. 4, 2010, pp. 1-5.
Written Opinion PCT Application No. PCT/US2009/065019, Jun. 4, 2010, 5 pages.
Written Opinion PCT Application No. PCT/US2010/043345 dated Apr. 28, 2011, 4 pages.
Written Opinion PCT/US2009/056651 dated Apr. 21, 2010, pp. 1-5.
International Search Report of PCT Application No. PCT/US2009/051313, dated Mar. 3, 2010, 3 pages.
International Search Report of PCT Application No. PCT/US2009/056651, dated Apr. 21, 2010, pp. 1-3.
International Search Report of PCT Application No. PCT/US2009/056668 dated Apr. 16, 2010, pp. 1-9.
International Search Report of PCT Application No. PCT/US2009/056668, dated Apr. 16, 2010, 9 pages.
International Search Report of PCT Application No. PCT/US2009/064919 dated Jul. 1, 2010, pp. 1-3.
International Search Report of PCT Application No. PCT/US2009/065019 dated Jun. 4, 2010, pp. 1-6.
International Search Report of PCT Application No. PCT/US2009/065019, dated Jun. 4, 2010, 6 pages.
International Search Report of PCT Application No. PCT/US2010/043345, dated Apr. 28, 2011, 3 pages.
International Search Report PCT/US2010/043345 dated Apr. 28, 2011, 3 pages.
M. Eric Johnson et al., The Evolution of the Peer-to-Peer File Sharing Industry and the Security Risks for Users, Jan. 1-10, 2008, IEEE, pp. 1-10.
Mango, "Robust Perceptual Image Hashing Using Feature Points," http://bluecoat-02/?cfru= aHR0cDovL3NpZ25hbC51Y2UudXRIeGFzLmVkdS9+ dmIzaGFs- L2hhc2gtcGFydEkucHM=, 2003.
Mango, "Robust Perceptual Image Hashing Using Feature Points," http://bluecoat-02/?cfru= aHR0cDovL3NpZ25hbC51Y2UudXRIeGFzLmVkdS9+ dmIzaGFs- L2hhagtcGFydEkucHM=, 2003.
Mango, et al., "Perceptual Image Hashing Via Feature Points: Performance Evaluation and Tradeoffs," IEEE Transactions on Image Processing, vol. 15, No. 11, Nov. 2006.
Mango, Robust Perceptual Image Hashing Using Feature Points, http://bluecoat-02/?cfru= aHR0cDovL3NpZ25hbC5IY2UudXRIeGFzLmVkdS9+dmizaGFs- L2hhc2gtcGFydEkucHM=, 2003.
Microsoft, "Microsoft XP, Product Guide", pp. 1-26, 2001.
Microsoft, "Microsoft XP, Product Guide", pp. 1-26.
Monga, "Robust Perceptual Image Hashing Using Feature Points," http://bluecoat-02/?cfru= aHR0cDovL3NpZ25hbC51Y2UudXRIeGFzLmVkdS9+ dmIzaGFs- L2hhc2gtcGFydEkucHM=, 2003.
Monga, et al., "Perceptual Image Hashing Via Feature Points: Performance Evaluation and Tradeoffs," IEEE Tranactions on Image Processing, vol. 15, No. 11, Nov. 2006.
Monga, et al., "Perceptual Image Hashing Via Feature Points: Performance Evaluation and Tradeoffs," IEEE Transactions on Image Processing, vol. 15, No. 11, Nov. 2006.
Monga, V. et al., Perceptual image hashing via feature points: performance evaluation and tradeoffs IEEE Transactions on Image Processing, 15 (11) (2006), pp. 3453-3466.
Nathaniel S. Good et al., Usability and privacy: a study of KaZaA P2P file-sharing, Apr. 5-10, 2003, ACM, vol. No. 5, Issue No. 1, pp. 137-144.
Non-Final Office Action dated Apr. 27, 2012 in Co-Pending U.S. Appl. No. 12/275,185, filed Nov. 20, 2008.
Non-final office action issued for U.S. Appl. No. 13/799,067 dated Oct. 30, 2014.
Non-Final Office Action dated Apr. 26, 2013 in Co-Pending U.S. Appl. No. 13/659,817 of More, S., filed Oct. 24, 2012.
Non-Final Office Action dated Apr. 27, 2012 in Co-Pending U.S. Appl. No. 12/275,185 of More, S., filed Nov. 20, 2008.
Non-Final Office Action dated Aug. 1, 2012 in Co-Pending U.S. Appl. No. 12/621,429 filed Nov. 18, 2009.
Non-Final Office Action dated Aug. 1, 2012 in Co-Pending U.S. Appl. No. 12/621,429 of More, S., filed Nov. 18, 2009.
Non-Final Office Action dated Aug. 13, 2013 in co-pending U.S. Appl. No. 13/306,819 by Glover, R.W., filed Nov. 29, 2011.
Non-Final Office Action dated Dec. 22, 2011 in Co-Pending U.S. Appl. No. 12/209,082.
Non-Final Office Action dated Dec. 6, 2012 in co-pending U.S. Appl. No. 13/306,798, filed Nov. 29, 2011.
Non-Final Office Action dated Jan. 9, 2012 in Co-Pending U.S. Appl. No. 12/177,043, filed Jul. 21, 2008.
Non-Final Office Action dated Jan. 9, 2012 in Co-Pending U.S. Appl. No. 12/171,043, filed Jul. 21, 2008.
Non-Final Office Action dated Mar. 11, 2011 in Co-Pending U.S. Appl. No. 12/209,096, filed Sep. 11, 2008.
Non-Final Office Action dated Mar. 16, 2006 for U.S. Appl. No. 10/023,010, filed Dec. 17, 2001, Issued U.S. Pat. No. 7,496,841.
Non-Final Office Action dated Mar. 16, 2006 in Co-Pending U.S. Appl No. 10/023,010, filed Dec. 17, 2001, Issued U.S. Pat. No. 7,496,841.
Non-Final Office Action dated Mar. 18, 2013 in Co-Pending U.S. Appl. No. 13/659,793 by More, S., filed Oct. 24, 2012.
Non-Final Office Action dated Mar. 18, 2013 in Co-Pending U.S. Appl. No. 13/659,793 of More, S., filed Oct. 24, 2012.
Non-Final Office Action dated Mar. 20, 2006 in Co-pending U.S. Appl. No. 10/136,733, filed Apr. 30, 2002.
Non-Final Office Action dated Mar. 20, 2006 in U.S. Appl. No. 10/136,733, filed Apr. 30, 2002.
Non-Final Office Action dated May 17, 2013 in co-pending U.S. Appl. No. 13/306,765 by Mulder, S. P. M, filed Nov. 29, 2011.
Non-Final Office Action dated May 7, 2008 in Co-pending U.S. Appl. No. 10/023,010, filed Dec. 17, 2001.
Non-Final Office Action dated May 7, 2008 in Co-Pending U.S. Appl. No. 10/023,010, filed Dec. 17, 2001, Issued U.S. Pat. No. 7,496,841.
Non-Final Office Action dated Sep. 19, 2011 for U.S. Appl. No. 12/177,043, filed Jul. 21, 2008.
Non-Final Office Action dated Sep. 19, 2011 in Co-Pending U.S. Appl. No. 12/177,043, filed Jul. 21, 2008.
Non-Final Office Action dated Sep. 19, 2012 in Co-Pending U.S. Appl. No. 12/844,818 by Glover, R., filed Jul. 27, 2010.
Non-Final Office Action dated Sep. 19, 2012 in Co-Pending U.S. Appl. No. 12/844,818 of Glover, R., filed Jul. 27, 2010.
Notice of Allowance dated Aug. 19, 2012 in Co-Pending U.S. Appl. No. 12/177,043, filed Jul. 21, 2008.
Notice of Allowance dated Jul. 8, 2013 in Co-Pending U.S. Appl. No. 12/209,082 by S. More et al. filed Sep. 11, 2008.
Notice of Allowance dated Jun. 26, 2012 in Co-Pending U.S. Appl. No. 12/275,185 of More, S., filed Nov. 20, 2008.
Notice of Allowance dated Jun. 26, 2012 in Co-Pending U.S. Appl. No. 12/275,185, filed Nov. 20, 2008.
Notice of Allowance dated Mar. 13, 2013 in Co-Pending U.S. Appl. No. 12/844,818 by Glover, R., filed Jul. 27, 2010.
Notice of Allowance dated Mar. 13, 2013 in Co-Pending U.S. Appl. No. 12/844,818 of Glover, R., filed Jul. 27, 2010.
Notice of Allowance dated Oct. 2, 2012, in Co-Pending U.S. Appl. No. 12/275,185 by More, S., filed Nov. 20, 2008.
Notice of Allowance dated Oct. 2, 2012, in Co-Pending U.S. Appl. No. 12/275,185 of More, S., filed Nov. 20, 2008.
Notice of Allowance dated Oct. 24, 2008 in Co-pending U.S. Appl. No. 10/023,010, filed Dec. 17, 2001.
Notice of Allowance dated Oct. 24, 2008 in Co-Pending U.S. Appl. No. 10/023,010, filed Dec. 17, 2001, Issued U.S. Pat. No. 7,496,841.

(56) References Cited

OTHER PUBLICATIONS

Notice of Allowance dated Sep. 25, 2013, in Co-Pending U.S. Appl. No. 13/659,817 by More, S., filed Oct. 24, 2012.
PC Magazine "Pure Intranets: Real-Time Internet Collaboration", Aug. 30, 2001.
PC Magazine "Pure Intranets: Real-Time Internet Collaboration", http://www.zdnet.com/pcmag/featuresgroupware/gpwst.htm, Aug. 30, 2001, 2 pages.
Bettenburg et al., An Empirical Study on the Risks of Using Off-the-Shelf Techniques for Processing Mailing List Data, 2009, IEEE 4 pages.
Bindu et al., Spam War: Battling Ham against Spam, 2011 IEEE 6 pages.
Bobba et al. Attribute-Based Messaging: Access Control and Confidentiality, 2010, ACM 35 pages.
Chen et al., Online Detection and Prevention of Phishing Attacks, 2006, IEEE 7 pages.
Kamouskos et al., Active Electronic Mail, 2002, ACM 6 pages.
Kaushik et al., Email Feedback: A Policy based Approach to Overcoming False Positives, 2005, 10 pages.
Stolfo et al., AMT?MET: Systems for Modeling and Detecting Errant Email. 2003, IEEE 6 pages.
Jain, Pravin. The class of JAVA. Aug. 12, 2010.
Workshare Ltd. Workshare Protect 4.5 Admin Guide, (c) 2006.
Classification Definitions, Data Processing: Presentation Processing of Document, Operator Interface Processing, and Screen Saver Display Processing; Feb. 2011; pp. 1-33.

\* cited by examiner

Figure 13

METHOD AND SYSTEM FOR COLLABORATIVE EDITING OF A REMOTELY STORED DOCUMENT

PRIORITY CLAIM

This application claims priority as a continuation-in-part to U.S. patent application Ser. No. 13/155,900 filed on Jun. 8, 2011 and as a non-provisional continuation-in-part to U.S. Provisional Patent Application No. 61/559,227 filed on Nov. 14, 2011 both of which are herein incorporated by reference in their entireties.

FIELD OF INVENTION

This invention provides a mechanism whereby a group of people operating individual computer devices can view and share and collaboratively edit an electronic document stored in a remote data repository.

BACKGROUND

Electronic documents, for example text documents, are now often stored in a remote data repository, sometimes referred to as an Entity Content Management system (ECM) or Document Management System. This type of system has one or more servers acting as storage locations for the document. The document is accessed by users operating their own computing devices. In order to facilitate collaborative editing of the remotely stored document, security protocols and data integrity protocols are instituted. This can be established by providing a collaborative environment that interfaces with the data repository. The ECM can be hosted internally in the corporation infrastructure and thereby locked down. In order to encourage electronic collaboration on editing or modifying documents it is useful to permit people to access the ECM from mobile devices but not going through the corporate VPN. Directly connecting mobile or other remote devices to the ECM requires permitting these devices access through the corporate data security wall. This is potentially dangerous from a data security standpoint. Therefore, there is a need for a collaborative environment that is hosted separately from the ECM for documents that are being collaboratively worked to be stored. This environment establishes a trusted connection with the ECM so that documents can be checked in and out of the ECM, but only by the trusted environment and not directly by any remote mobile or other device. The trusted collaboration server permits the ECM to remain behind a network security wall.

DETAILED DESCRIPTION OF THE PREFERRED EMBODIMENTS

The method and system operates on one or more computers, typically using one or more servers and one or more remote user's computing devices. (1601) A customer's device can be a personal computer, mobile phone, mobile handheld device like a Blackberry™ or iPhone™ or a tablet device like the iPad™ or Galaxy™ or any other kind of computing device a user can use to view and edit an electronic document. The user devices are operatively connected to the remote server using a data network. The invention does not require that the data network be in continuous contact with the remote file server. The invention works in combination with document collaborative editing system (CES) and document management systems, sometimes referred to as Entity Content Management (ECM). An example of ECM discussed here, without limiting the invention to that embodiment, is Sharepoint™. The system can be embodied in a client/server architecture, whereby an executable code operates on the user's remote device and interacts with processes operating on the CES. In other embodiments, the same system can be running on the user's remote device by means of scripts or apps that are downloaded and executed within an Internet web-browser.

Figure 6:
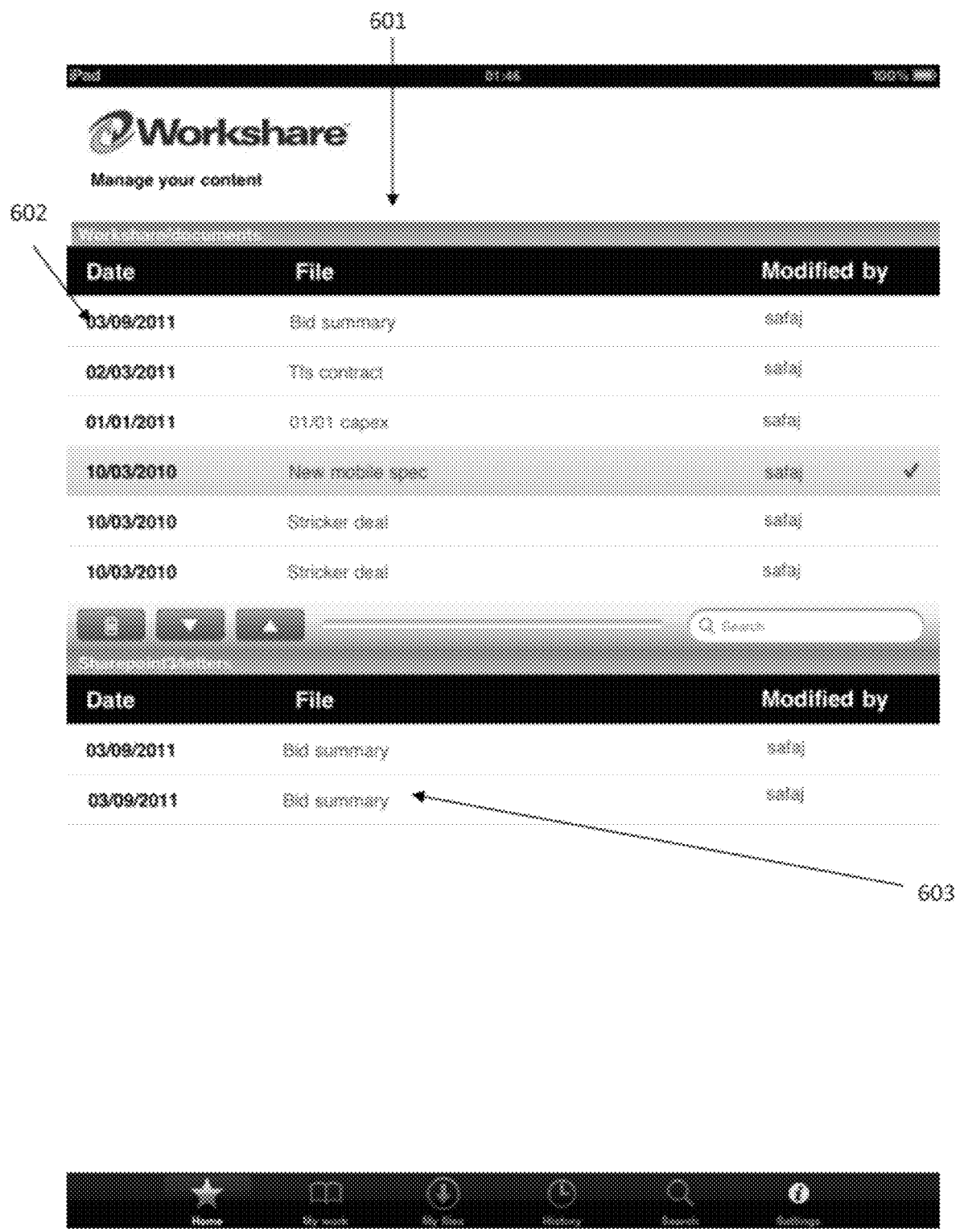
FIG. 6. User interface presentation of Workshare™ window and Sharepoint™ window FIG. 7. User interface presentation of a request to review a document alert FIG. 8. User interface presentation of the editing window FIG. 9. User interface presentation showing the geographic location where the reviewers are FIG. 10. User interface presentation of the Workshare folders on the collaborative editing system CES.
Figure 7:
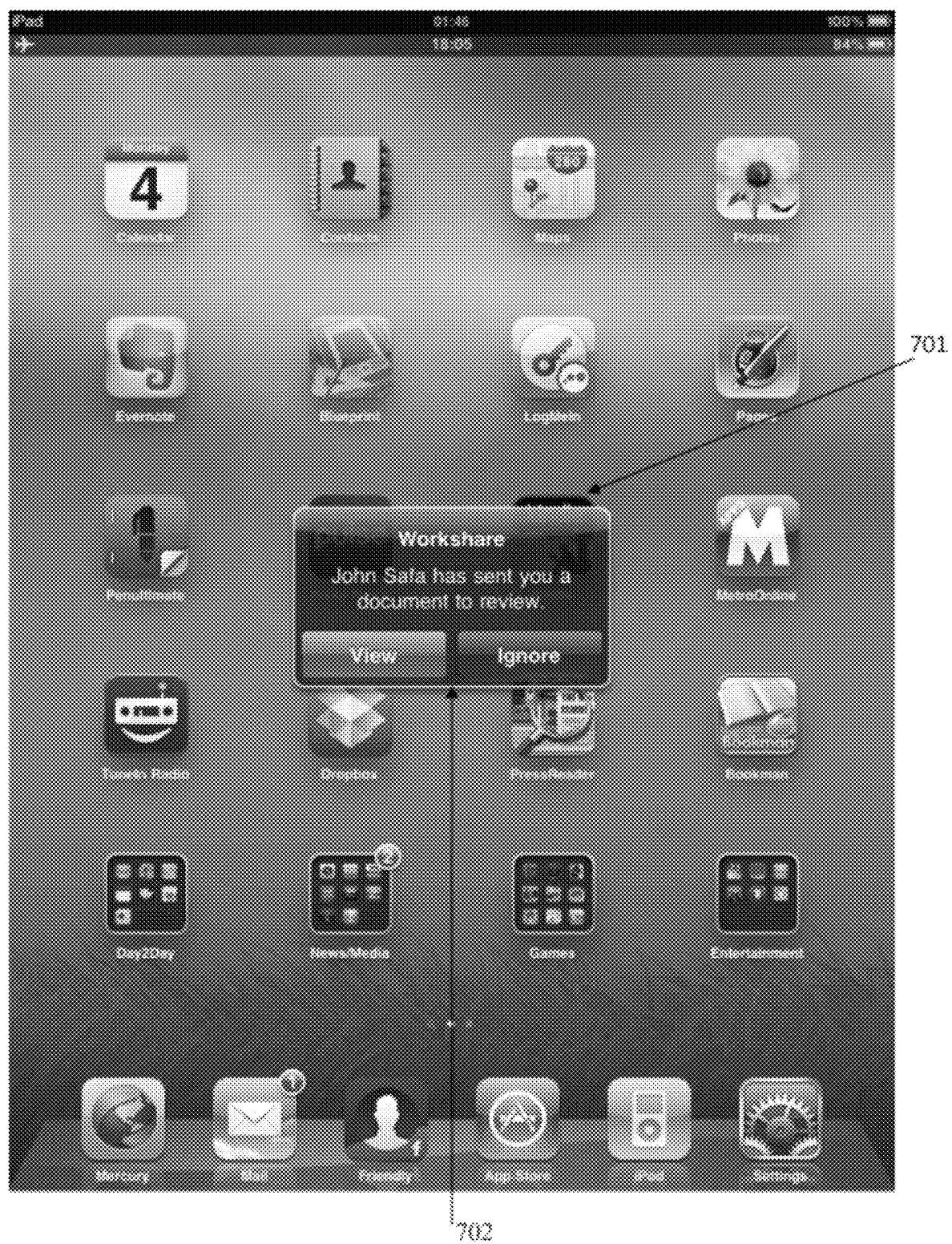
Figure 8:
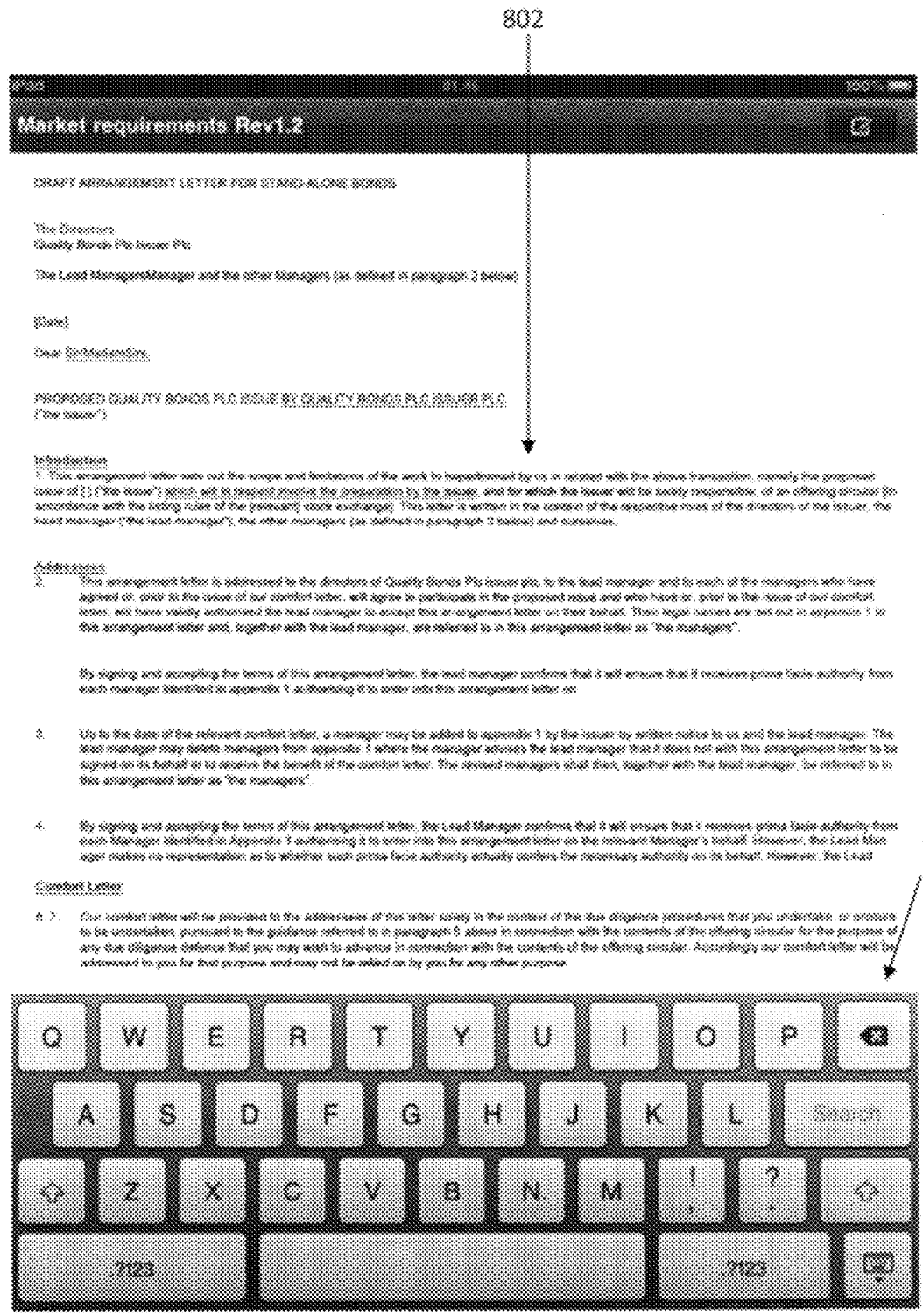

The user's remote computer is operatively connected to a data communication network, typically the Internet. (1602). This may be directly or indirectly through another network, for example a telephone network or a private data network. The user operates a client software on their computing device that communicates with the CES. (1603). In one embodiment, the client communicates directly with the CES and the CES interacts with the ECM to request documents. (1604). In this embodiment, the client displays on its video output a user interface window to the user, that shows two regions, one listing documents available on the ECM and the other showing documents available on the CES. See FIG. 6. In this embodiment, the client software executes a security protocol with the CES in order to establish a connection. It then transmits a request to the CES system for a list of available files on the ECM. This request may include a selection of a directory or other delimiting information or metadata. The CES formulates a secure request and transmits the request to the ECM. The ECM responds to the request by transmitting one or more data packets with the list of files requested. The CES transmits this list back to the requesting device. The client receives this list and renders the list on the output display in the region associated with the ECM. See FIG. 6, (603).

When the client requests the list of documents available on the CES, the request is received and processed on the CES. That data is presented in the user interface in the region associated with the CES. (601) In the default mode, the CES will present a list of documents from a folder associated with that user on the CES platform. (602) In the default mode, the CES will cause the ECM to deliver a list of documents from the root folder configured by the user as the default folder on the ECM. The list of documents can also include as an item a reference to another folder. (101). This folder may be selected in order to view the contents of that folder. (201). The list can also be presented as a chronological list of incoming data messages regarding particular documents. (102). In all of these cases, the CES system is receiving commands from the client operating on the user's computer and brokering the requests out to the ECM. The responses from the ECM are then formatted and transmitted back to the user's computer for display. In one embodiment, each user of the CES has a directory or folder on the CES dedicated to the user and associated with their remote device. Using this architecture, the user that is checking out a document from the ECM has the document stored in their directory on the CES for access only by them from their remote device.

In some case, the CES may be subject to a large amount of document request traffic when a large number of users are requesting documents. In this case, the CES's connection with the ECM may become taxed and the system will slow down. To alleviate this, another embodiment may be used. In this embodiment, the CES maintains a copy of the most recently used documents. In this embodiment, when a user requests a document, the system operates under the assumption that another user will soon request the same document. When that second user does request the same document, the CES transmits it from its local store of documents rather than making two requests to the ECM. In the meantime, the CES can transmit to the ECM a data message that flags the document as having been change, thus establishing that the ECM does not have the latest version of the document. Alternatively, the CES can transmit to the ECM the latest version of the document, but it only has to do that when such a later version is created. In yet another embodiment, the local storage system on the CES can rely on heuristics to pre-fetch documents from the ECM. For example, the CES can use metadata associated with a requested document to determine that it is associated with several other documents. In that case, the CES can proactively request the other documents so that they are on the CES if the user requests them. Security or permission for access can be managed by the CES. For example, if a user requests a document that is not on the CES, then the CES formulates a full request to the ECM, which checks that user's permission to access the document. If the local storage system requests the document, it will do so in the name of the user and thereby populate the local storage system on the CES with documents with a permission value associated with the user. In yet another embodiment, the heuristic may also include checking on a user's document request habits to determine which additional documents may be requested. Another example of a heuristic is to pre-load all of the recently used documents modified or read by the same user. Alternatively, all documents in a project that the user's selected document is a part of A project can have a permission list which lists which usernames may access the documents associated with the project. Alternative lists include a list of recipients of any document associated with the project.

In this embodiment, the system is adapted to:
Receive a request for a document from a first user's computer.
Retrieve the requested document from the ECM.
Store a local copy in a local store on the CES.
Receive a request for the same document from a different user's computer.
Authenticate the different user,
Deliver the local stored copy to the different user's computer.

The system can be enhanced by also having the retrieving the additional relevant documents to be locally stored. The system would then be further adapted to:
Determine the identity of at least one relevant document, based on either the identity of the requesting user, that user's use history, the relationship between the requested document and other documents or some other heuristic.
Retrieve the at least one relevant documents,
Store the at least one relevant documents in the local store.

Figure 10:
Figure 11:
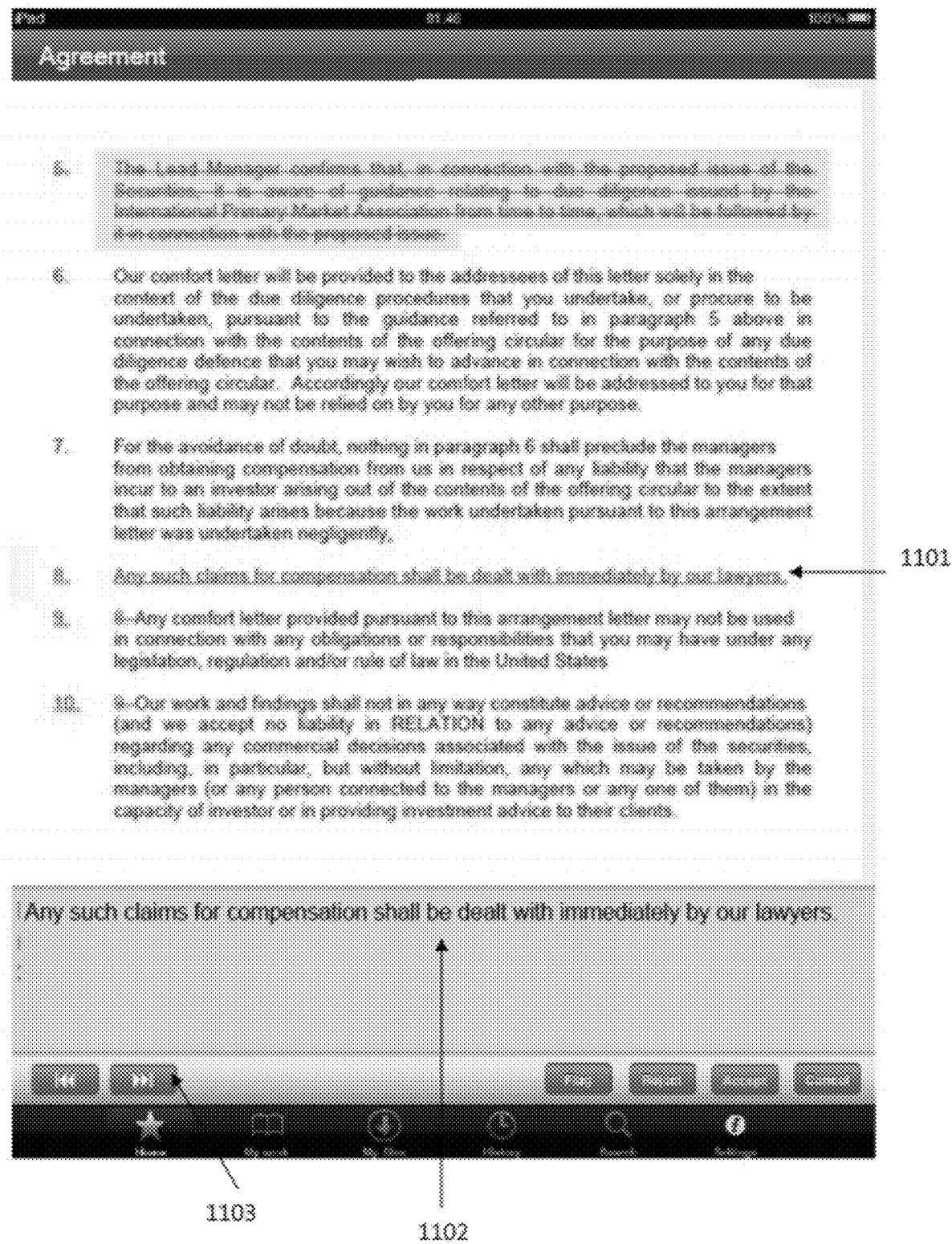
FIG. 11. User interface presentation of the document markup with a magnification of markup item as displayed in the portable device embodiment FIG. 12. Another view of the user interface presentation of the document markup with a magnification of the edited item as displayed in the portable device embodiment FIG. 13. User interface presentation of the document markup with the markup item highlighted as displayed in the typical computer embodiment FIG. 14. User interface presentation of adaptive content collaboration that detects the metadata content and then decides whether to open an accept/reject or text type markup view FIG. 15. User interface presentation of receipt of an alert of the acceptance FIG. 16. Flowchart of the basic architecture of the system FIG. 17. Flowchart for authentication and passing of commands from remote device to ECM through CES.
Figure 12:
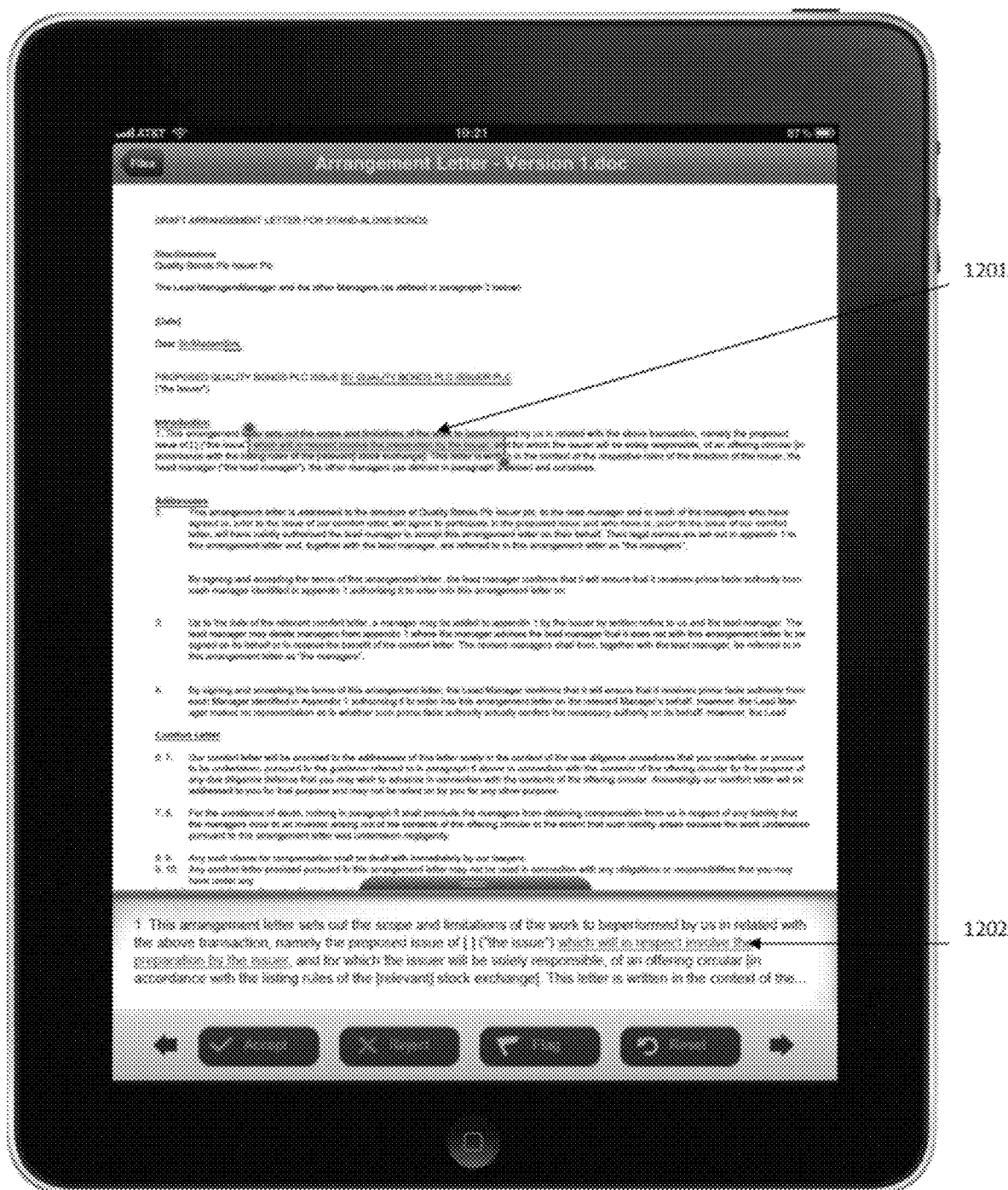

The collaborative editing functionality can be applied to a document hosted on the ECM by checking out the document into the CES. On the user interface of the remote device, the user can select a document that is represented by an entry on the portion of the user interface devoted to the ECM documents. The user can, by gesture, drag that document to the other region that is devoted to the CES. (601) This causes commands to be transmitted to the CES (1603) in order to cause it to request the document itself from the ECM (1604). In one embodiment, the command is comprised of name of the requested document and the destination region in the user's CES folder hierarchy that has been selected. The CES then receives the document, stores the document in the folder associated with the user, and then updates the content list for the CES. See FIG. 10. Periodically, the CES causes documents requested by the remote device to be transmitted to it and also to receive updated documents from the remote device, so that they user's folder on the CES and the associated documents on the remote device are synchronized. Alternatively, the user can select a document that is stored in the CES and shown diagrammatically on the user interface as occupying the region devoted to the CES and by gesture, drag the document to the other region devoted to the ECM. In this case, commands are transmitted from the client to the CES that cause the CES to log into the ECM and transmit the selected file to the ECM. The commands that the client transmits to the CES would include the filename of the selected file, the authorization code associated with the user and the destination on the ECM.

Remote devices receive the latest changes of the documents that have been distributed to them, but the CES system holds all historic versions of the document. The CES system periodically polls or otherwise determines that the user's remote device does not have the document and it will then transmit the document to the device. The commands between the remote device and the CES and ECM is not folder to folder or directory to directory. Rather, its process to process, where the processes are moving files and metadata associated with the files and processes are using the metadata to route the files internally. The system executing the process can exist on either the ECM or CES platform, that is the ECM platform can receive commands from the CES and transmit to the remote device directly, or transmit to the CES. If running on the CES platform, then the ECM may need a secure VPN connection to the CES environment. (1605).

When the CES system is operated so as to edit or otherwise change the stored document, a change flag data value associated with the document is changed. This data value is stored on the CES as part of the metadata of the document. As a result, periodically the CES can copy changed documents from their stored location on the CES back up to their original locations in the ECM, including the relevant updated metadata.

In yet another embodiment, the ECM logs into the CES, a time check is used to see if the files resident on the user's remote device, which have been synchronized to the CES, have been superseded by newer versions. If so, these newer versions are transmitted to the ECM. In another embodiment, the versioning check can be done periodically or as a result of a triggered event.

Triggers include:
1. checking the date and time stamp on the CES version of a document and if newer than on the ECM version, loading into the ECM.
2. Any new document.
3. A command from a central authorized party to collect the latest revisions.

The system can also process the documents being loaded into the ECM, for example:
1. a heuristic checks the document content and determines how to label it and checks its metadata in order to enter into the ECM within the ECM document organization. That is, its position in the ECM hierarchy is selected and stored in the ECM hierarchy based on what is in the metadata.
2. Reviewing the authors of the document to determine where to place it in the ECM.
3. Review of the document content to determine where to place it in the ECM, including using phrase matching search of the ECM to find similar or related documents.

The process can create a list of the files to be moved or it can set flags in the metadata of the files and the ECM process will go through the user's files that are flagged and cause the CES system to transmit them to the remote device or to the CES system. (102), (201). The remote device can request from the CES a data item that represents a tree diagram showing lineage of historical changes to or versions of the document. The user interface of the device can present this tree and then permit the user to select a node in the tree, representing a particular version of the document to be viewed or further edited. In another embodiment, a user with appropriate authority can specify that a particular node in the tree become the primary or current version of the document.

In some cases, a document may be checked out from the ECM and CES by two different users. In this case, the system can prevent version conflicts quite easily. One of the two users will be the first to check their version of the document back into the CES system, which will then pass it on to the ECM. In the meantime, the CES, which tracks the identity of the second user, will generate a data message representing an alert that the version of the document that the second user is using is now out of date. In this case, the second user can cause the second version of the document to be transmitted to the CES, which can then combine it with the checked in first version in order to present to the second user a markup showing what changes to the document were made by the first user while the second user had checked out the document.

The heuristic selection of documents to maintain in the local CES storage can be accomplished with one or more approaches, search, metadata, tracking, activity tracking and user behavior. These can be combined. The search technique would firstly identify the most recently accessed documents and then based on the documents that have been identified, it can use the metadata associated with those documents to find related documents or documents with similar metadata. The metadata approach exploits the fact that documents can have custom properties or other types of metadata associated with them which can be used to infer or determine related documents and those related documents can be added to the suggested documents list. In addition, documents can be tracked. For example, a document could have a unique signature embedded in the document or the signature or fingerprint could be created based on the content of the document. The reason for tracking the document would be to uniquely identify the document and associate an activity such as emailing a document or sending the document electronically to another person or interactive workflow. This will allow the system to identify if the document the user is looking for is located in a repository or awaiting another user or systems feedback. That way they can be assured that they are working on the latest or correct version of the document. The activity technique involves using a list of documents which the user most recently viewed, edited or made comments. The comments could be made in an email or any system that allowed the user to provide comments relating to a particular document or contents of that document. Furthermore it can apply weighting to depending on what action was applied to the document to the document. Actions applied to that document would include submitting a document to a workflow or process for review, viewing the document, editing the document or making comments. If there is more activity around the document it would allow the document to bubble up the suggested document list, so that older content can appear at the bottom and eventually disappear off the suggested document list. (102). Use of user behavior involves monitoring how a user works. If a user performs an activity on document A and then following that activity the user performs another activity on documents B and C, that information can be used in future to identify that documents A, B and C are related in some way. As a result of the inferred relationship between the documents they can also be listed in the suggested documents list. Based on the users behavior the system can identify common or related metadata and use that information to refine the list of documents generated.

An important aspect of the system is to maintain security over the ECM. The transport channels between the CES and the remote device are typically using encrypted, secure data channels, for example SSL. In one embodiment, each command submitted by the CES to the ECM is accompanied with authentication information. This can include a unique identifier that is only known to the CES and ECM, for example a login identifier and password. In another embodiment, the ECM is operating internally to a corporation's infrastructure. In that case, a network firewall (1605) between the CES and the ECM can be programmed to establish a secure connection between the CES and ECM. Each data packet traveling between the CES and ECM can be encrypted so that a man-in-the-middle attack, whereby the data is intercepted en-route, cannot compromise the integrity of the data. In this embodiment, the user logs into the CES system from their remote location and establishes a secure connection with the ECM. In yet another embodiment, the CES can transmit a message containing authentication details that includes the commands to transmit the files to particular locations in the CES. In this embodiment, the ECM system will log into the CES system using the authentication data and execute the transfer.

In yet another embodiment, the CES can create a digital data item called a token, which is essentially a string of alphanumerical characters that can be embodied in a small data file and transmitted as part of a data message. Tokens can be revoked or disabled by the CES. Tokens can be revoked or disabled on a regular basis. The CES can transmit the token to a user's mobile device. When a data message is received from the user's mobile device, (1701) for example, a request for a document, the message also carries the token. The CES can check that the received token matches up with the one that was transmitted to the user. (1702). To insure integrity of this approach, the client program operating on the user's mobile device will encrypt the token as it is received in memory so that only an encrypted version of the token is stored. When the decryption of the token occurs, it is only stored in volatile memory such that after it is transmitted in a data message, the memory is flushed so that the decrypted token is destroyed. If the user's request for document data is authenticated (1702), then the CES can formulate the request message that is submitted to the ECM (1703). The CES then receives the document data from the ECM (1704) and then transmits the document data back to the user's device (1705).

In another embodiment, the token is hashed and stored in a database on the CES associated with the username. The token is then destroyed. The authentication process for the token can only be accomplished by executing the hash, because a received token alone will not map to the username.

In yet another embodiment, the token can be generated by the ECM and then passed to the CES, which can verify its authenticity. The token can then be passed on to the user's mobile device. The token has to be the same in both the CES and the ECM to ensure that the chain of trust is not broken.

The process running on the remote device can encrypt the documents that are stored on the device. In another embodiment, the documents are encrypted on the CES prior to transmission to the remote device. These are then decrypted within the secure operating memory space in the remote device, using the input of the user's password. In many devices, the operating system of the device establishes a range of secure memory locations, each range dedicated to an application that is running on the device. In these embodiments, the document is secure because the operating system prevents data from moving between the different secure ranges. In some cases, the operating system encrypts the memory range. When the application is terminated, the decrypted documents present in the associated memory range are immediately deleted and only the encrypted forms of the documents remain on the remote device.

The documents stored on the CES can be encrypted. In one embodiment, each document has its own symmetric key is assigned. When a user wishes to receive a document, a private key is generated that is used to encrypt the document already encrypted using the symmetric key. The private key is stored encrypted using user's data password and the clear version of the key is deleted. When user is present on the CES, the CES system can do something with the document. When user logs off, then the password is lost because it is not stored in the clear. The password only becomes accessible again when the user logs in with their password.

Additional security includes disabling the ability of a remote device to access the CES. This is accomplished by having the device run the application. The application initially contacts the CES with the device identity information.

Figure 9:
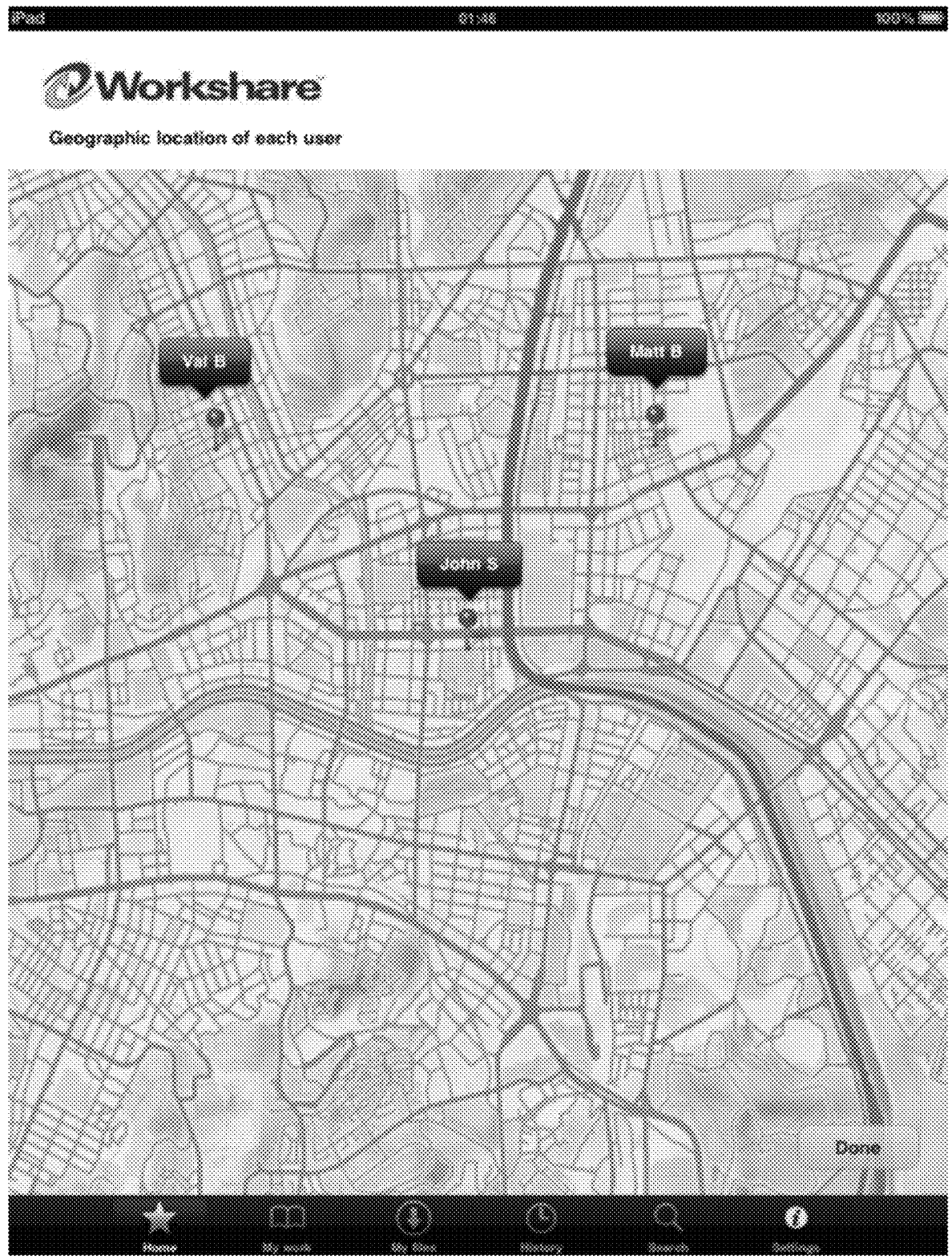

If the CES determines, prior to permitting log-in, that the device has been terminated, the app receives information to that effect and instantly deletes from the remote device all of the documents associated with the CES. This security mechanism can be combined with the geolocation capabilities of the remote device. In this embodiment, the component operating on the remote device transmits within a data message data representing the detected location of the remote device. The system can be adapted so that if the received geographic location is inconsistent with the security policies of the system, the remote device is instructed to flush the documents within it and the connection for that user is blocked regardless that the user's portable device is authenticated. This way, if a remote device is stolen and hacked, its location can be used as an additional authentication mechanism. Another user of the system can also view where the recipients of a document are located by means of receiving data representing the geographic location received from the remote devices of those users. This data can be displayed to the first user. See FIG. 9.

The use of remote device level filtering permits the CES to update materials selectively. For example, some remote devices may receive updates of documents based on their user's inclusion on a specific permission list for that update. Or, if an employee has moved departments, their permission level for a particular family of documents may be altered so that their device does not receive the updates.

The CES can also be used to deal with emailed documents. In the case of an incoming email, with an attachment, the email application may filter the email to route it to a client folder. In one embodiment, the filter can specify that any "@workshare" string can filter it to the "workshare" folder. Therefore, an additional menu item can be added to the email client that immediately causes an email to be forwarded to the "workshare" environment. As a result of doing that, the attachment to that email is detached from the email transmission data structure and is then transmitted to the CES to be stored in a directory associated with the "workshare" project. The metadata associated with the document can include the date and time the email was received, the sender of the email, the recipient of the email, and any pertinent data that can be extracted from the body of the email message itself, for example, the subject line of the email.

The system can check whether the sender of the email is identified with a known party and if so, if there are already selectable categories on the ECM for documents related to that party. This data is transmitted to the remote device so that the user interface can display selections from which the user may select as a destination folder for the document.

A heuristic can be used here too for populating metadata regarding document type. The heuristic can be used to map known email addresses associated with particular parties with certain metadata, so that joeblow@yahoo.com is always associated with bigco. In addition, the email message can be parsed to extract the other recipients of the email thread in order to automatically generate permission lists for that document. Email messages in the thread from particular persons may be stored as metadata indicating comments on the document that can be located in the document and presented with the identity of the commenting person.

Figure 1:
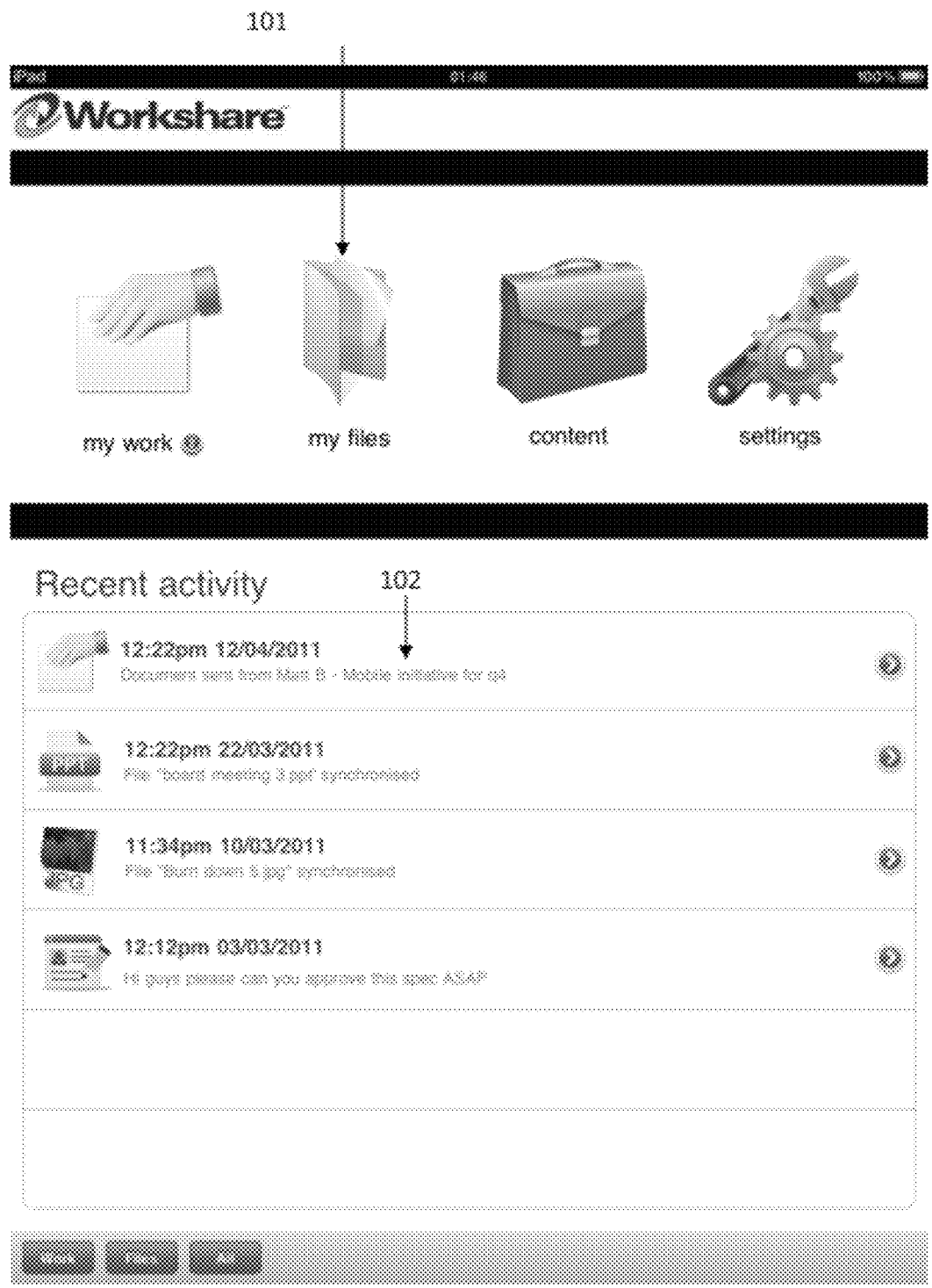
FIG. 1. User interface presentation of the home page for the user
Figure 2:
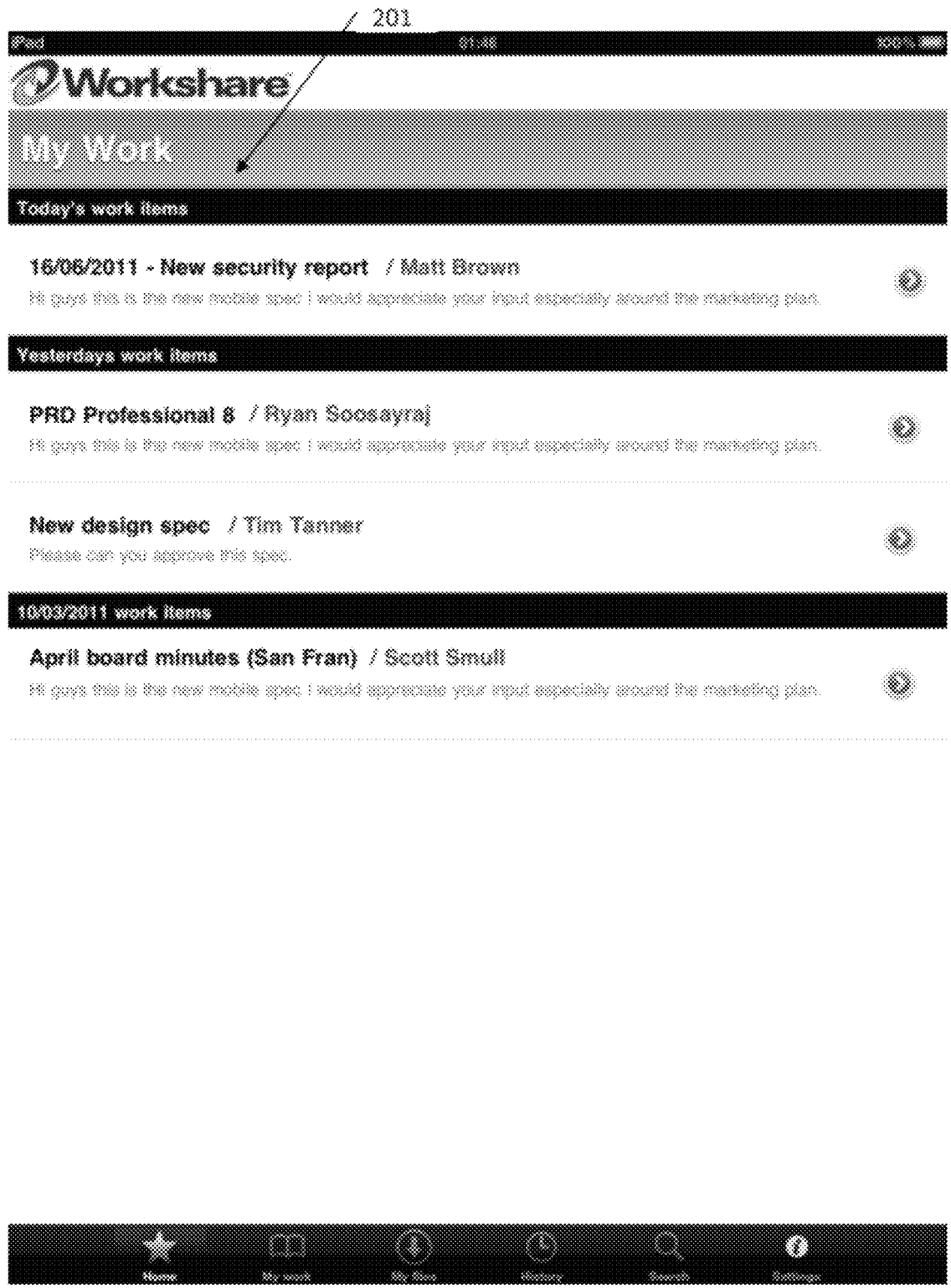
FIG. 2. User interface presentation of work items by time stamp
Figure 3:
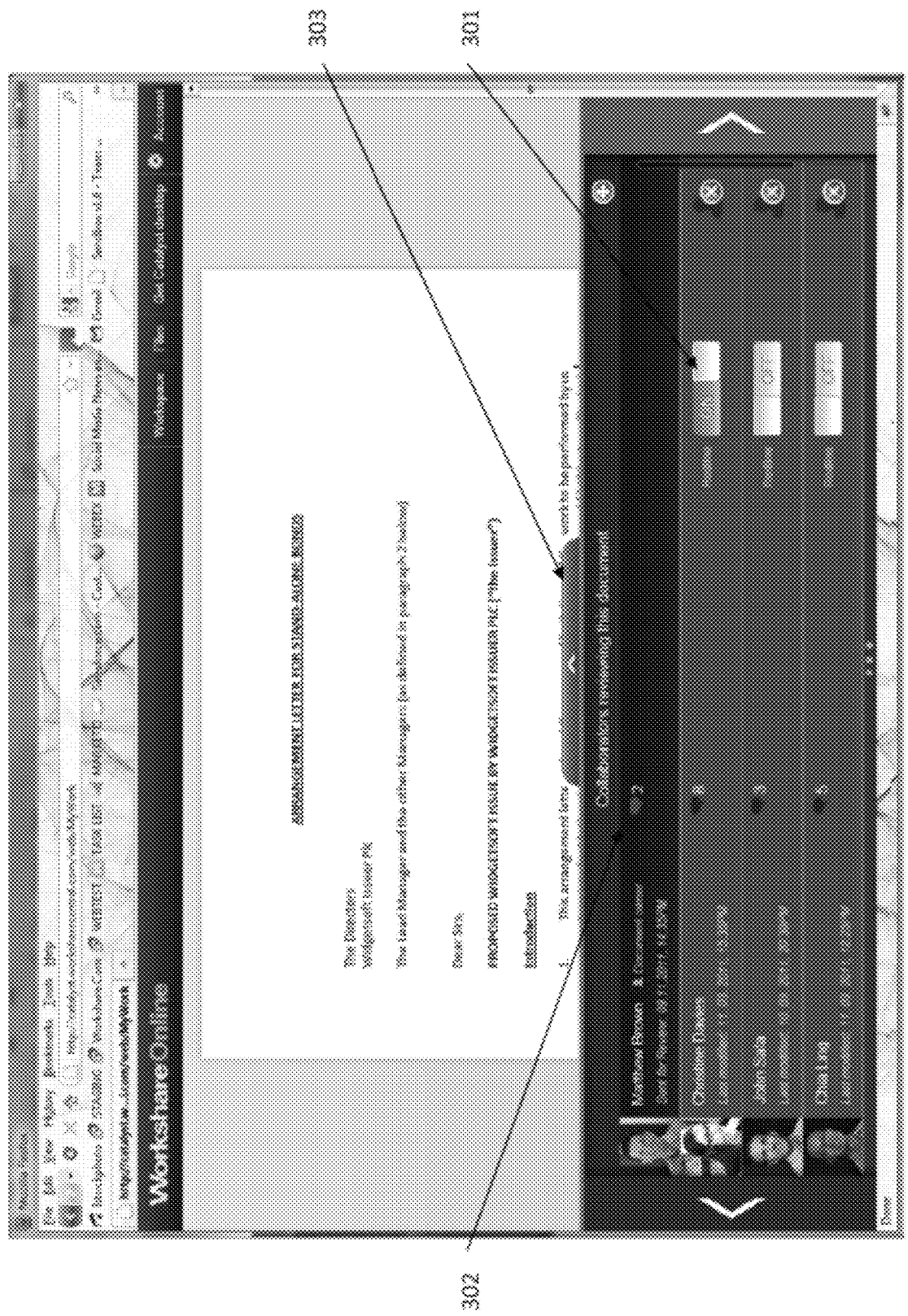
FIG. 3. User interface presentation of a document

FIG. 3 shows that a document that is viewed on the user's device can be presented showing the other users that have commented or edited the document. The user can select which reviewer's edits or comments are to be viewed using the on/off button (301) or selecting the comment button (302). The portion of the display that presents the buttons can be pushed down using the tab (303) in order to provide more viewing room for the document. When a reviewer's button is switched on, then those changes are displayed (401). In another embodiment, the reviewer window can be switched to a mode where the reviewer comments are presented. (501). The comments can be associated with a page or location in the document. Two direction arrows (502), (503) on the reviewer display window navigate to the next or prior comment, with the document page at the same time being updated to the location where the edit being commented on is located.

In another embodiment, the CES can receive a command from a document author to have their document submitted to another reviewer for review. In that case, the system component operating on the reviewer's remote device will receive a notice that such a request is pending and will display and alert on the screen. (701). The alert can be in the form of a dialogue box that when actuated launches the reviewing screen or an alternative to have the request stored and queued. (702). If the reviewer launches the review screen, the reviewer can also actuate the interface to cause a virtual typewriter keyboard to be presented, which causes the remote device to convert touches into text, the letters being selected based on the location of the finger touches. (801). The input text will appear as a markup. (802).

Figure 14:
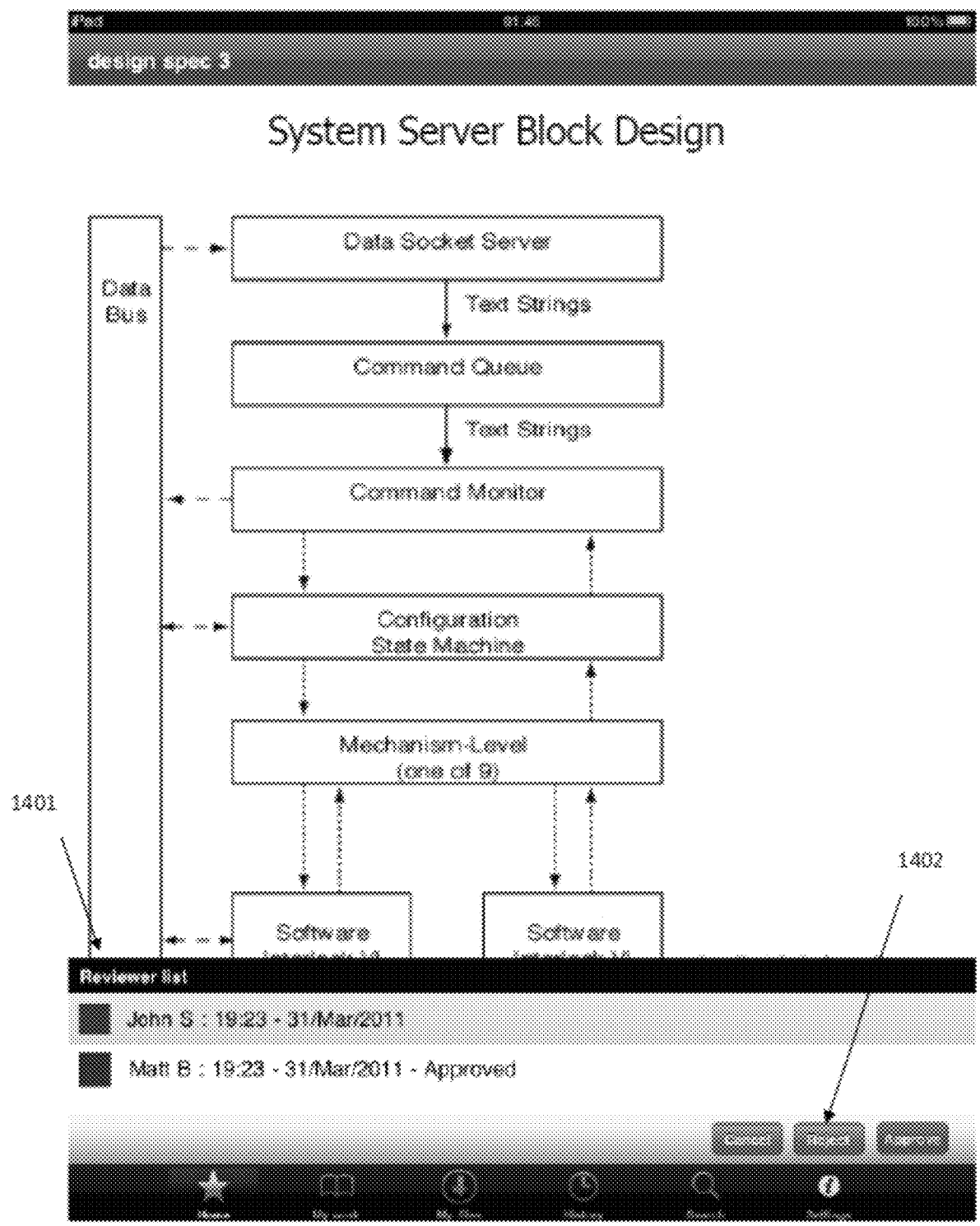
Figure 15:
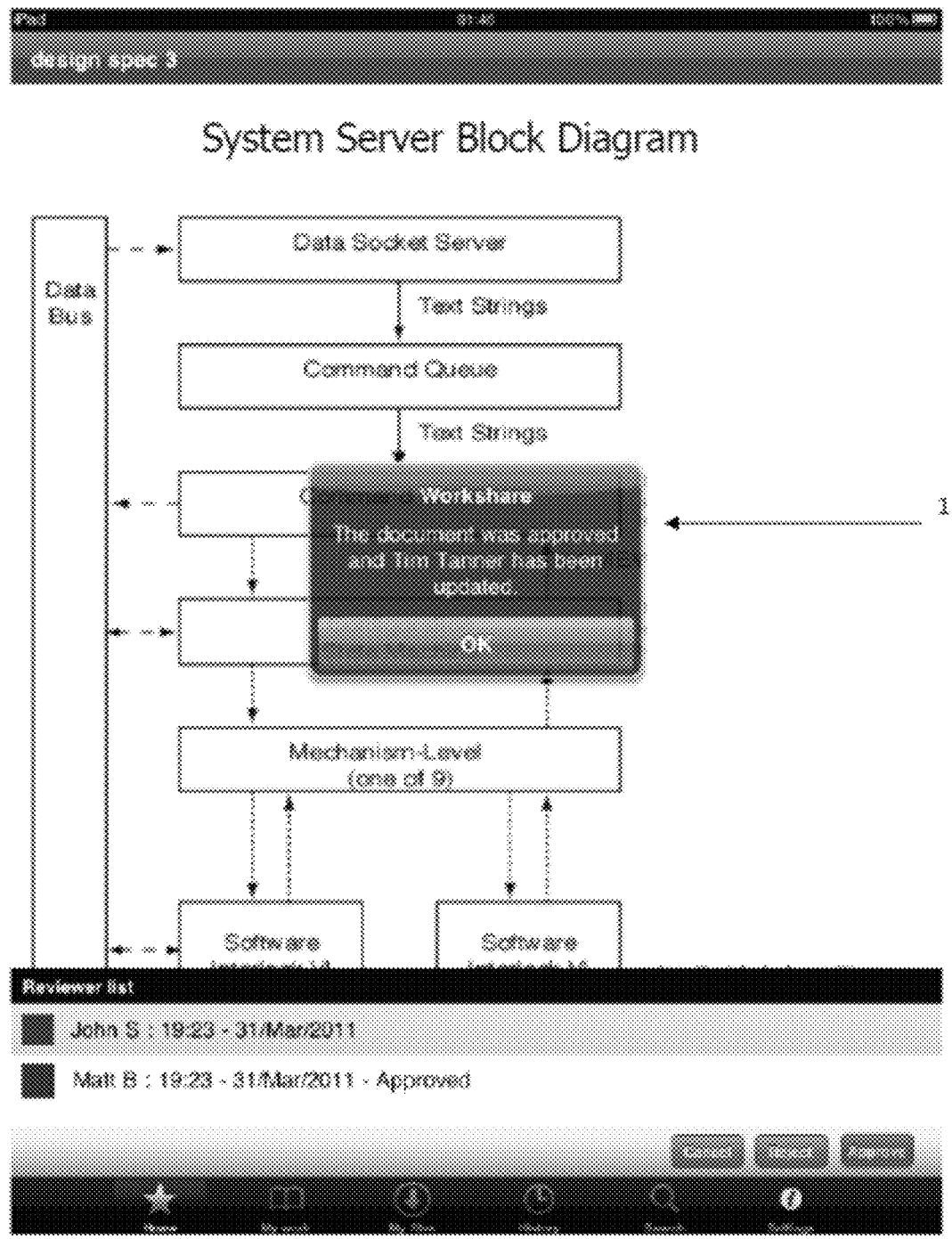
Figure 16:
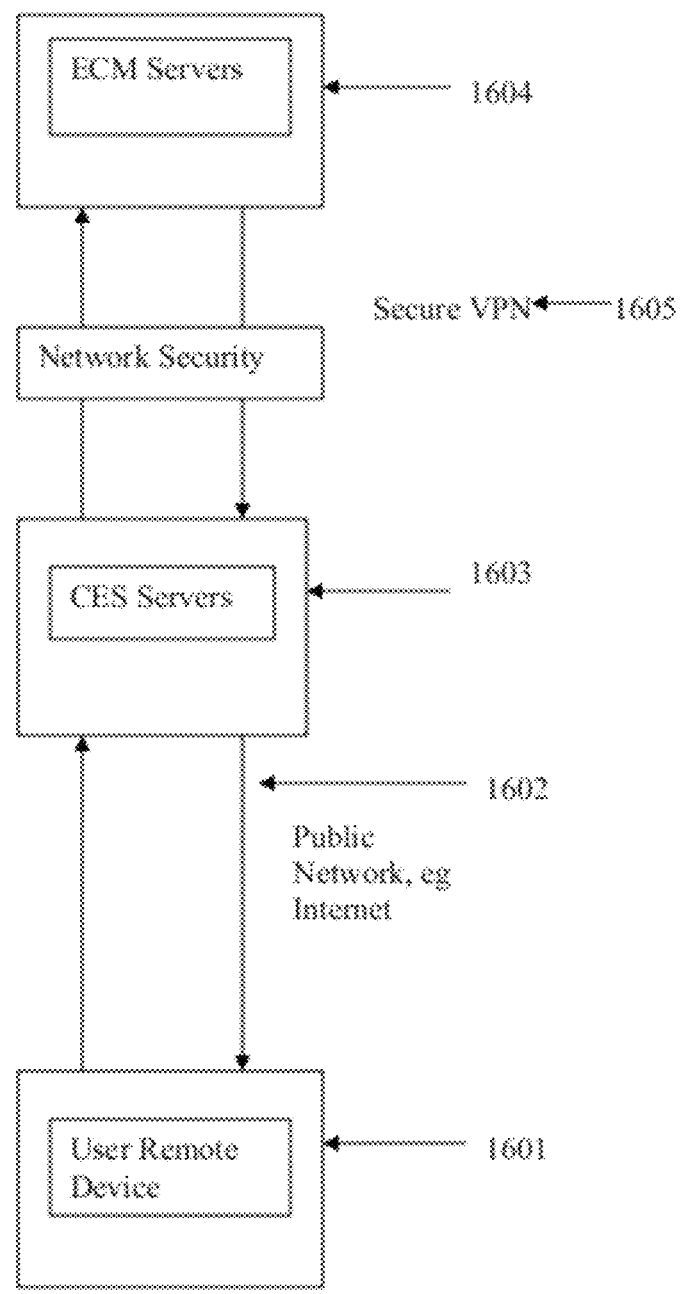
Figure 17:
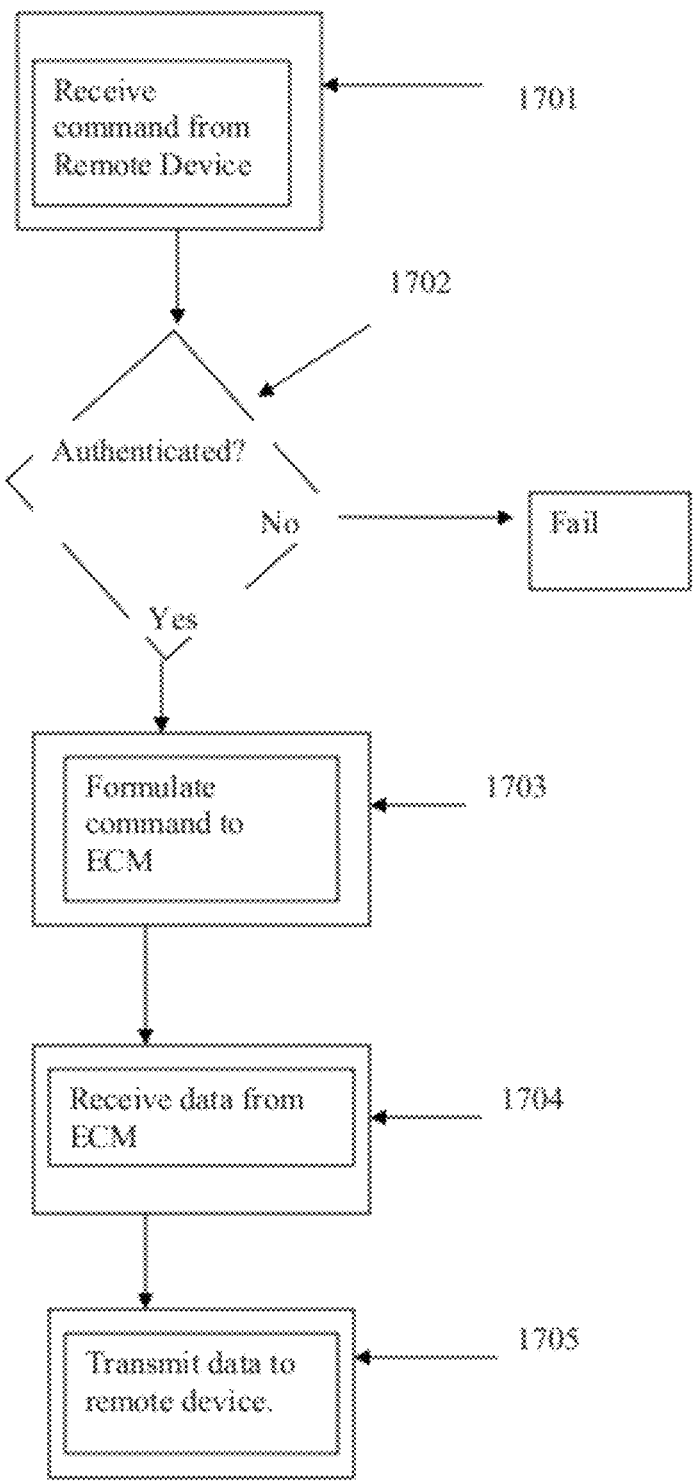

If the document is being presented for approval, then a different screen can be presented. FIG. 14. In this embodiment, the screen is adapted to present the approval history of the document, (1401) which is metadata updated in the CES and transmitted down to the remote device. If the current reviewer approves or rejects it, by means of actuating buttons on the screen, (1402), this data is transmitted up to the CES. When the CES receives the metadata indicating approval or rejection, and the identity of the reviewer, that information along with the identity of the reviewer, is stored as part of the metadata associated with the document, but is also transmitted to the user that requested approval. This status is presented on the reviewers screen. (1501).

Figure 4:
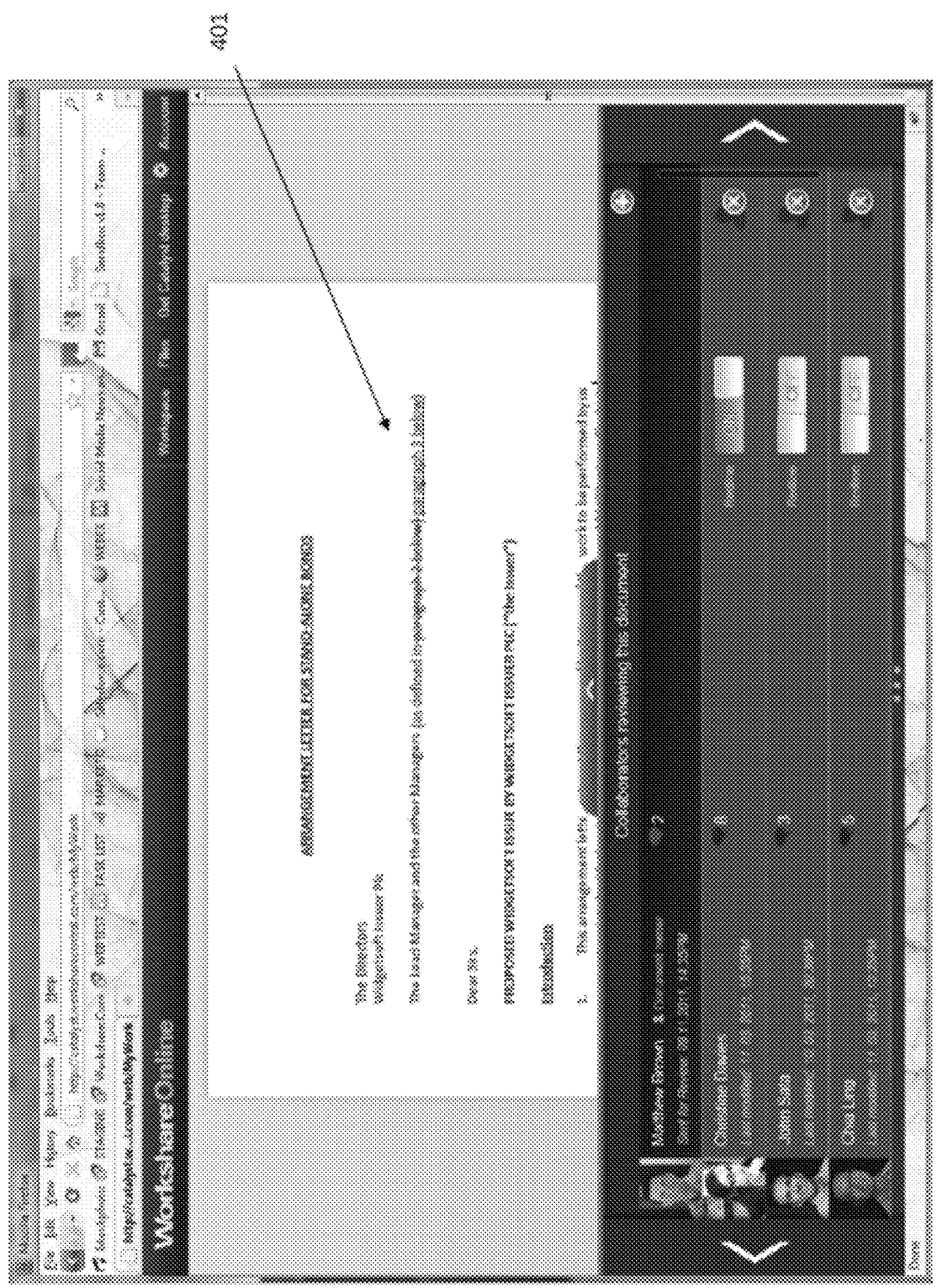
FIG. 4. User interface presentation of the document markup
Figure 5:
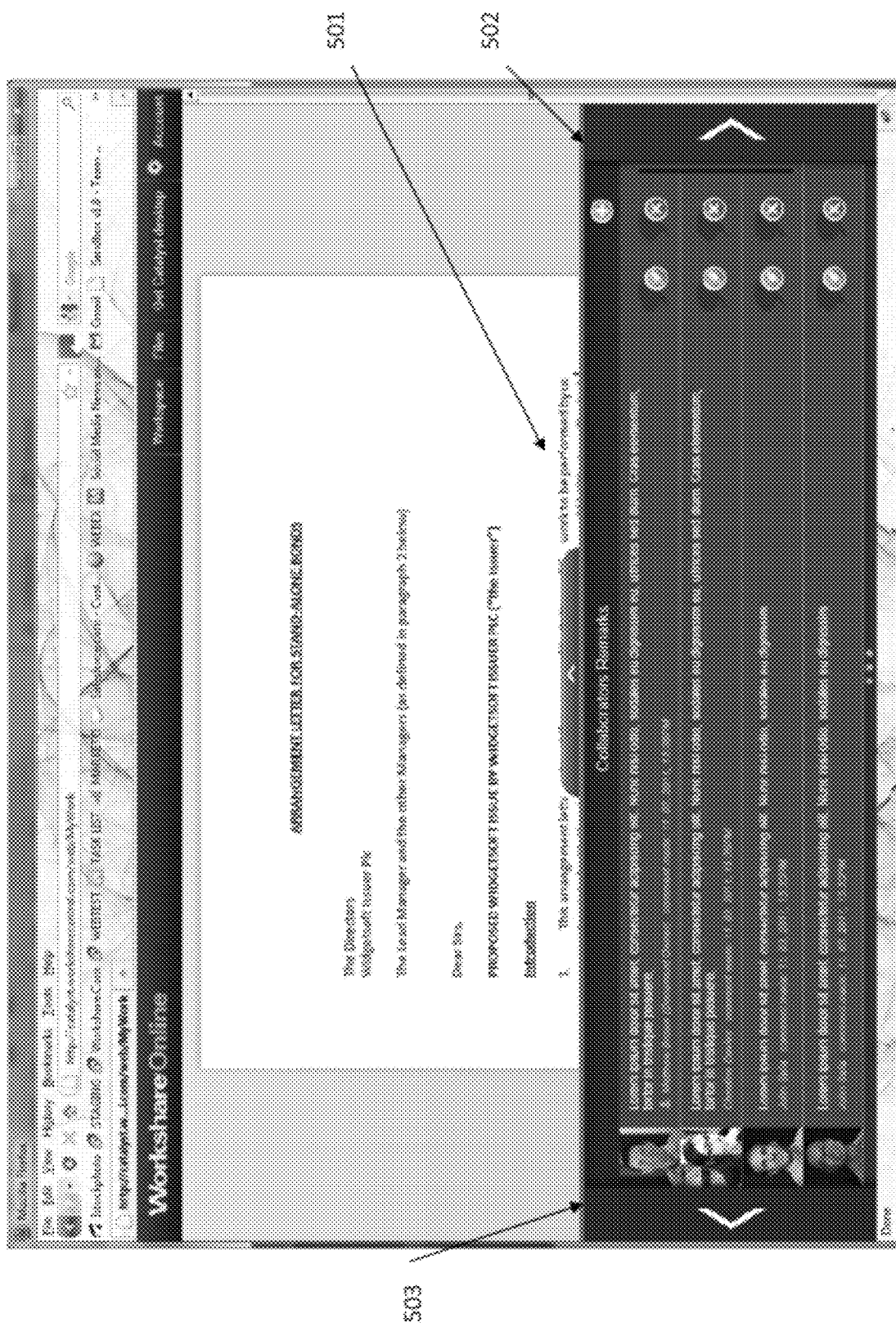
FIG. 5. User interface presentation of the document showing comments

In yet another embodiment, the remote device can present a display screen that conveniently presents the edits. In this embodiment, the reviewing window is comprised of a region that presents a magnified version (1102) of the text that is the current edit being considered. (1101). As the reviewer actuates buttons to move to the next edit (1103), the main page is changed and also the magnified region presents the next edit in larger typeface. Another embodiment of this invention is where the system is adapted so that the magnified region presents the current edit in context. (1201). In this case, the system determines what region of text surrounds the edit and using a selection algorithm, determines the bounds of the local relevant text. Once that determination is made, the local relevant text is displayed in the magnification window. (1202). The determination can be made on the basis of selecting the entire sentence the edit is in, or, selecting the entire paragraph, or selecting the text between blank lines. Combinations of this can be used. For example, if the sentence is longer than some amount or the edit short, the single sentence may suffice. If the edit is intricate, as in many elements, then the paragraph might be selected. If the paragraph is too long relative to a predetermined amount, then a portion of the paragraph. In cases where the remote device has a large enough display screen, the user can select a review screen that does not use the magnification adaptation. FIG. 4.

Operating Environment:

The user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The system and method described herein can be executed using a computer system, generally comprised of a central processing unit (CPU) that is operatively connected to a memory device, data input and output circuitry (I/O) and computer data network communication circuitry. A video display device may be operatively connected through the I/O circuitry to the CPU. Components that are operatively connected to the CPU using the I/O circuitry include microphones, for digitally recording sound, and video camera, for digitally recording images or video. Audio and video may be recorded simultaneously as an audio visual recording. The I/O circuitry can also be operatively connected to an audio loudspeaker in order to render digital audio data into audible sound. Audio and video may be rendered through the loudspeaker and display device separately or in combination. Computer code executed by the CPU can take data received by the data communication circuitry and store it in the memory device. In addition, the CPU can take data from the I/O circuitry and store it in the memory device. Further, the CPU can take data from a memory device and output it through the I/O circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The system is typically comprised of a central server that is connected by a data network to a user's computer. The central server may be comprised of one or more computers connected to one or more mass storage devices. The precise architecture of the central server does not limit the claimed invention. In addition, the data network may operate with several levels, such that the user's computer is connected through a fire wall to one server, which routes communications to another server that executes the disclosed methods. The precise details of the data network architecture does not limit the claimed invention.

A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as FORTRAN, C, C++, JAVA, or HTML or scripting languages that are executed by Internet web-broswers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the specification is intended only to provide an extremely detailed disclosure of the present invention and is not intended to be limiting.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed:

1. A computer system for providing remote access to documents comprised of:
   a first server comprised of a first computer memory device, said first computer memory device comprised of data embodying a document,
   a second server in communication by a data network with said first server and in further communication with a remote device,
   said remote device further comprised of a receiving module adapted by logic to receive from the second server data representing directory listings comprised of a data referencing a document,
   a first transmitting module adapted by logic to transmit to the second server a data message containing a request comprised of the reference to the document,
   said second server being comprised of an authentication module adapted by logic to authenticate the request received from the remote device by executing a first security protocol between the remote device and the second server to determine a first authenticated logic state associated with the received document request and in response to the first authenticated logic state, execute a second security protocol between the first server and the second server to determine a second authenticated logic state for the received document request, and in response to the second authenticated logic state, transmit to the first server a request for the referenced document, where the first server is further comprised of
   a second transmitting module adapted by logic to transmit the referenced document to the second server.

2. The system of claim 1 where at least one of said data message commands is comprised of a request for one of renaming, deleting, copying, or moving said document and the second server is comprised of a third transmitting module that transmits the at least one commands to the first server for execution, said first server being further comprised of an execution module that executes the received at least one command.

3. The system of claim 2 where the remote device is a computer operating an Internet browser program that is operating a secure protocol to provide web based access to the second server in order to access data from the first server.

4. The system of claim 1 where the first transmitting module on the remote device is adapted by logic to transmit to the second server an at least one authentication token associated with the at least one command messages.

5. The system of claim 1 where at least one of the command messages is a command requesting that the second server retrieve a directory data structure from the first server, then transmit the retrieved directory data structure to the remote device.

6. The system of claim 1 where the system is comprised of a copying module configured by logic to cause a plurality of the files on the second server to be copied to the first server upon said module detecting a pre-determined logical condition in the plurality of files on the second server.

7. The system of claim 6 where the copying module is configured by logic to delete the copied files from the second server after the copy to the first server has been stored.

8. The system of claim 6 where the logical condition is based on a predetermined test of metadata associated with the plurality of files on the second server.

9. System of claim 6 where the logical condition is derived from the data comprising the content present in the plurality of files.

10. The system of claim 6 where said copying module is adapted by logic to expunge the metadata, markups and comments associated with the plurality of data files after the files are moved into first server.

11. The system of claim 6 further comprising a geographic identifier module adapted by logic to insert a geographic identifier into the document at the remote device, and the first server is further adapted by logic to selectively determine whether to permit the file to be stored on the first server based on the value of the geographic identifier.

12. The system of claim 11 further comprising a quarantine module adapted by logic to quarantine the file if the geographic identifier is determined to be associated with a no permission location.

13. The system of claim 1 further comprising a selection module adapted by logic comprising the first server to store a plurality of pre-selected documents in local storage on the second server.

14. The system of claim 13 where the selection module is further adapted by logic to make a pre-selection based on one of search, metadata, tracking, activity history and user behavior.

15. The system of claim 13 where the logical location of the local storage is associated with a user identity.

16. The system of claim 13 where the selection module is further adapted by logic to make a pre-selection based on a determination that the selected document has metadata that makes the document related to metadata associated with a document already present in the local storage.

17. The system of claim 13 where the selection module is further adapted by logic to make a pre-selection based on a determination that the selected document is a document that in the past was selected by a user after having requested a document already present in the local storage.

18. The system of claim 1 where the remote device is comprised of a user interface screen and a user interface module adapted by logic to present on the user interface screen two regions, one that presents icons associated with items stored on the second server and the other icons associated with items stored on the first server.

19. The system of claim 18 where the user interface module is further adapted by logic to detect the condition when the user has selected an icon on the user interface region associated with the first server and has dragged the icon to the region associated with the second server so as to cause a command to be transmitted from the remote device to the second server requesting that the second server request the document associated with the selected icon to be transmitted from the first server to the second server.

20. The system of claim 1 where the second server is comprised of a directory module adapted by logic to provide a storage directory exclusively associated with the user operating the remote device where all documents requested by said user to be retrieved from the first server are stored.

21. The system of claim 1 where the second server is further comprised of a directory module adapted by logic to determine that the remote device does not have the latest version of the document and in that condition, to transmit the latest version of the document to the remote device.

22. The system of claim 1 where the receiving module, the first and second transmitting modules are adapted by logic to use process to process messages to transmit commands and data between them.

23. The system of claim 1 where the second server is further comprised of a data flag module adapted by logic to assign a data flag representing the condition that the requested document has been changed and to periodically, determine those document files whose changed data flags are set in order to transmit the changed documents to the first server.

24. The system of claim 23 where the data flag module is further adapted by logic so that upon a trigger condition, the document file is transmitted to the first server and stored at a location on the first server associated with the document file, said trigger condition being one of: the time stamp in the metadata associated with the document is younger than the original time stamp, the document is a new document, and external command from an authorized party.

25. The system of claim 1 where the second server is further comprised of a condition flag checking module adapted by logic to check for condition flags in the metadata associated with the document and based on the condition flag state, cause the file to be transmitted to the remote device.

26. The system of claim 1 where the user interface module on the remote device is further adapted by logic to present on the remote device display screen a tree diagram showing the lineage of historical changes or versions of the document.

27. The system of claim 26 where the user interface module on the remote device is further adapted by logic to permit the user to select a node on the displayed tree diagram so as to select for download to the remote device, that selected version of the document.

28. The system of claim 1 further where the second server is further comprised of a directory module adapted by logic to detect the condition that the version of the document transmitted to the remote device has been superceded by a newer version and to cause a message to be transmitted to the remote device alerting the user of that condition.

29. The system of claim 1 further adapted by logic to cause a remote device email client operating on the remote device to automatically route an email associated with a predetermined folder with an associated identity that has a document attached, to be forwarded to the second server, where the second server is further comprised of an email module configured to automatically isolate the document from the email and store the document in a directory location associated with the associated identity.

30. The system of claim 29 where the email module is further adapted by logic to generate and store metadata based on the information present in the email data and to have the generated metadata to be associated with the stored document.

31. The system of claim 30 where the email module is further adapted by logic to cause a selection of an identity determined to be associated with the sender of the email to be inserted into the metadata.

* * * * *